(12) United States Patent
Jacob Da Silva et al.

(10) Patent No.: US 9,148,389 B2
(45) Date of Patent: Sep. 29, 2015

(54) SYSTEM AND METHOD FOR A VIRTUAL CHASSIS SYSTEM

(71) Applicants: Roberto H. Jacob Da Silva, Oak Park, CA (US); Gregory G. Page, Sandy, UT (US); Surajit Bhattacharya, Thousand Oaks, CA (US); Chung-Hua Chang, Temple City, CA (US); Stephen C. Hanka, Lindon, UT (US); Steve Larsen, Riverton, UT (US); Christopher Francis Ravenscroft, Woodland Hills, CA (US); Eric W. Tolliver, Moorpark, CA (US); Anand Vinayagam, Oak Park, CA (US); Shaofu Wu, West Hills, CA (US); Ignatius D. Santoso, Thousand Oaks, CA (US); Nalinakshan Kunnath, Camarillo, CA (US); Stephen R. Bates, Salt Lake City, UT (US)

(72) Inventors: Roberto H. Jacob Da Silva, Oak Park, CA (US); Gregory G. Page, Sandy, UT (US); Surajit Bhattacharya, Thousand Oaks, CA (US); Chung-Hua Chang, Temple City, CA (US); Stephen C. Hanka, Lindon, UT (US); Steve Larsen, Riverton, UT (US); Christopher Francis Ravenscroft, Woodland Hills, CA (US); Eric W. Tolliver, Moorpark, CA (US); Anand Vinayagam, Oak Park, CA (US); Shaofu Wu, West Hills, CA (US); Ignatius D. Santoso, Thousand Oaks, CA (US); Nalinakshan Kunnath, Camarillo, CA (US); Stephen R. Bates, Salt Lake City, UT (US)

(73) Assignee: Alcatel Lucent, Boulogne-Billiancourt (FR)

( * ) Notice: Subject to any disclaimer, the term of this patent is extended or adjusted under 35 U.S.C. 154(b) by 394 days.

(21) Appl. No.: 13/674,259

(22) Filed: Nov. 12, 2012

(65) Prior Publication Data

US 2013/0077621 A1 Mar. 28, 2013

Related U.S. Application Data

(63) Continuation-in-part of application No. 13/010,168, filed on Jan. 20, 2011, now Pat. No. 8,767,735.

(60) Provisional application No. 61/370,622, filed on Aug. 4, 2010, provisional application No. 61/658,159, filed on Jun. 11, 2012.

(51) Int. Cl.
*H04L 12/939* (2013.01)
*H04L 12/775* (2013.01)
*H04L 12/709* (2013.01)
*H04L 12/931* (2013.01)
H04L 12/707 (2013.01)
H04L 12/703 (2013.01)

(52) U.S. Cl.
CPC ............ *H04L 49/552* (2013.01); *H04L 45/245* (2013.01); *H04L 45/58* (2013.01); *H04L 49/40* (2013.01); *H04L 49/70* (2013.01); H04L 45/22 (2013.01); H04L 45/28 (2013.01)

(58) Field of Classification Search
CPC ..... H04L 49/70; H04L 45/586; H04L 45/583; H04L 45/58; H04L 49/357; H04L 45/245
See application file for complete search history.

(56) References Cited

U.S. PATENT DOCUMENTS

| | | | |
|---|---|---|---|
| 7,483,383 B2 | 1/2009 | Santoso et al. | |
| 7,505,403 B2 | 3/2009 | Santoso et al. | |
| 2005/0259649 A1* | 11/2005 | Smith | 370/389 |
| 2011/0085559 A1* | 4/2011 | Chung et al. | 370/401 |
| 2011/0149743 A1* | 6/2011 | Agarwal et al. | 370/242 |
| 2013/0243008 A1* | 9/2013 | Singla et al. | 370/422 |

* cited by examiner

*Primary Examiner* — Jung Park
(74) *Attorney, Agent, or Firm* — Loza & Loza, LLP

(57) ABSTRACT

A virtual chassis system includes a plurality of network nodes configured with a master virtual chassis address. The network nodes are connected by virtual fabric link (VFLs) that provide a connection for exchange of packets between the network nodes. The packets include source MAC addresses and associated hardware device information, such as source chassis ID, source network interface identifier and source port identifier information. The network nodes use this information to maintain synchronized MAC address tables for forwarding of packets in the virtual chassis system.

13 Claims, 16 Drawing Sheets

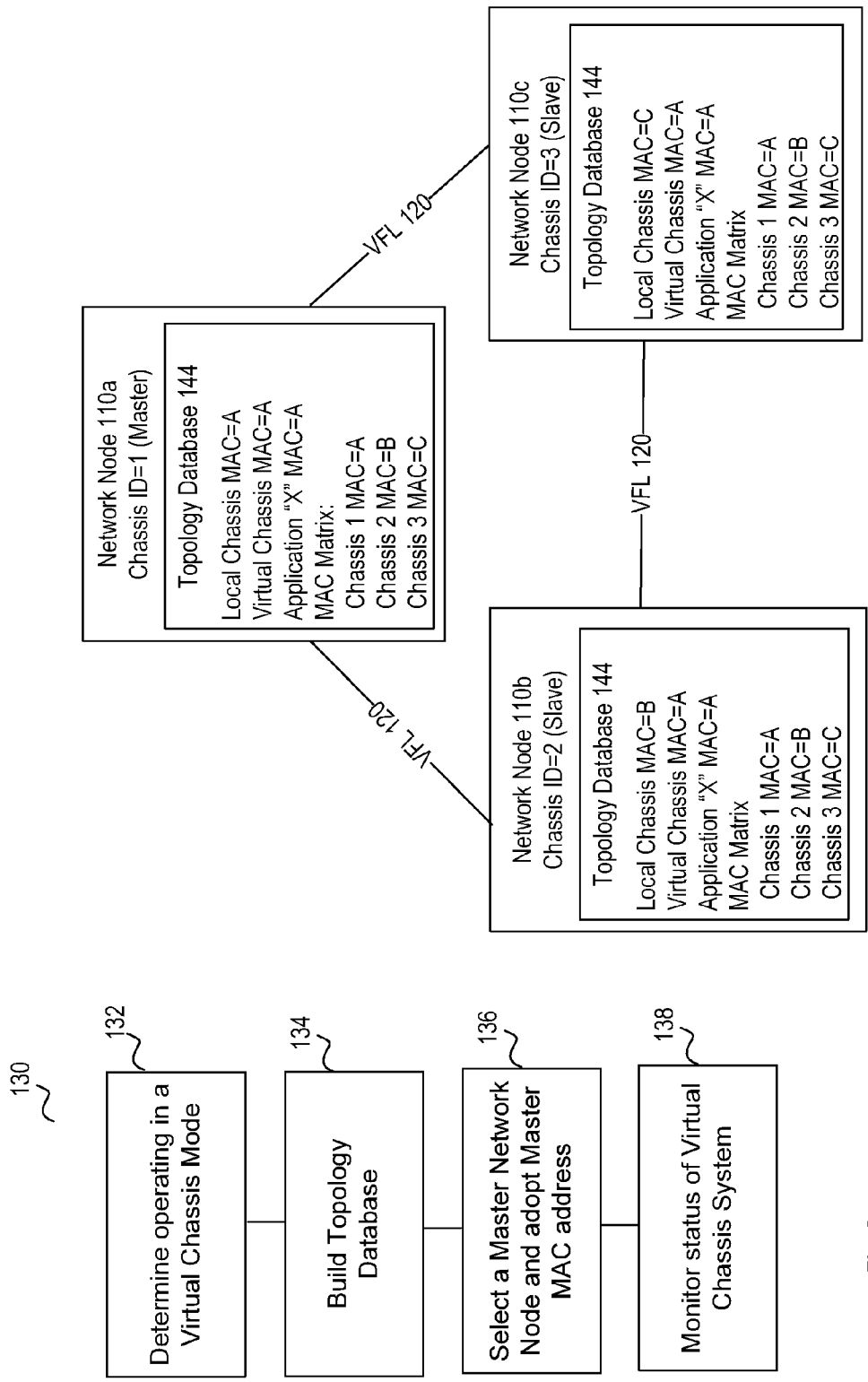

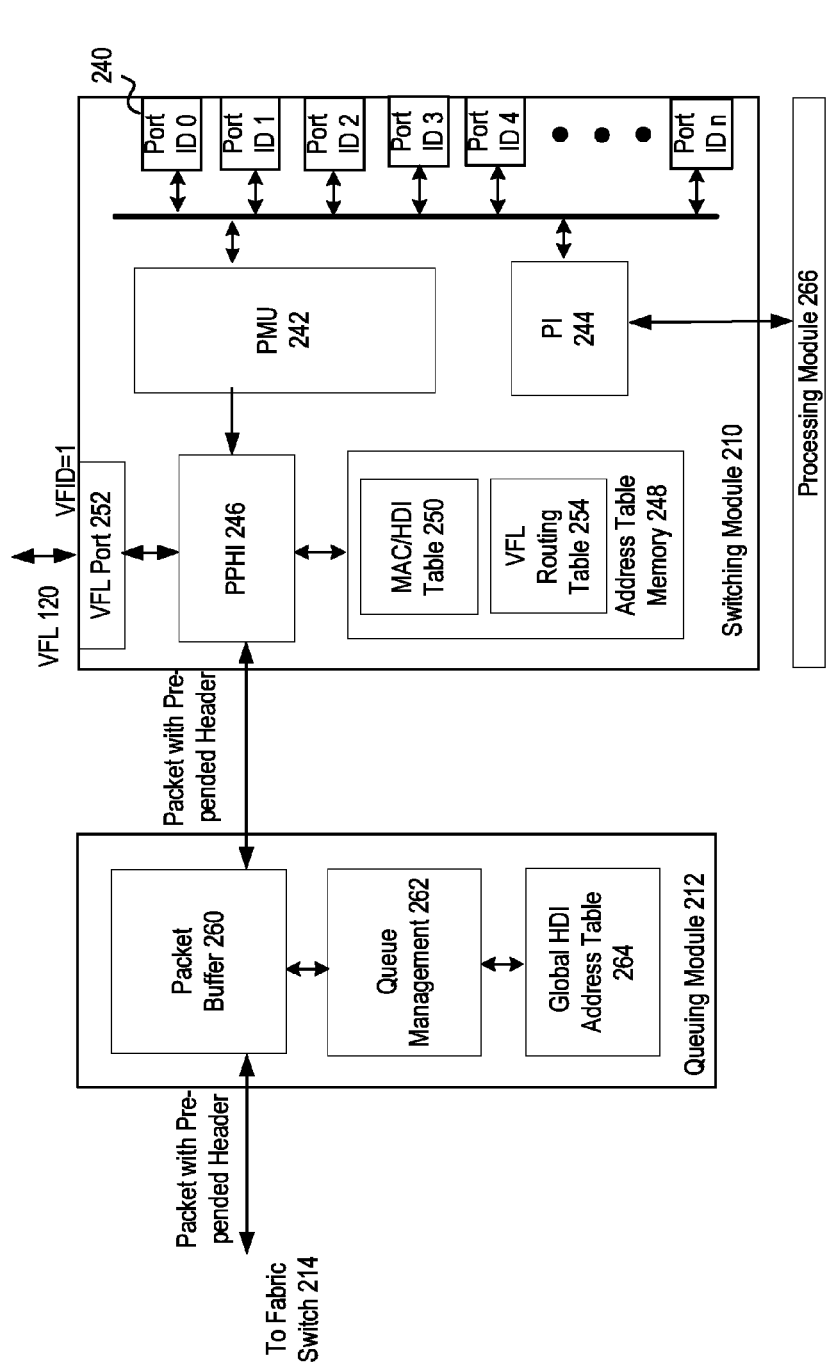

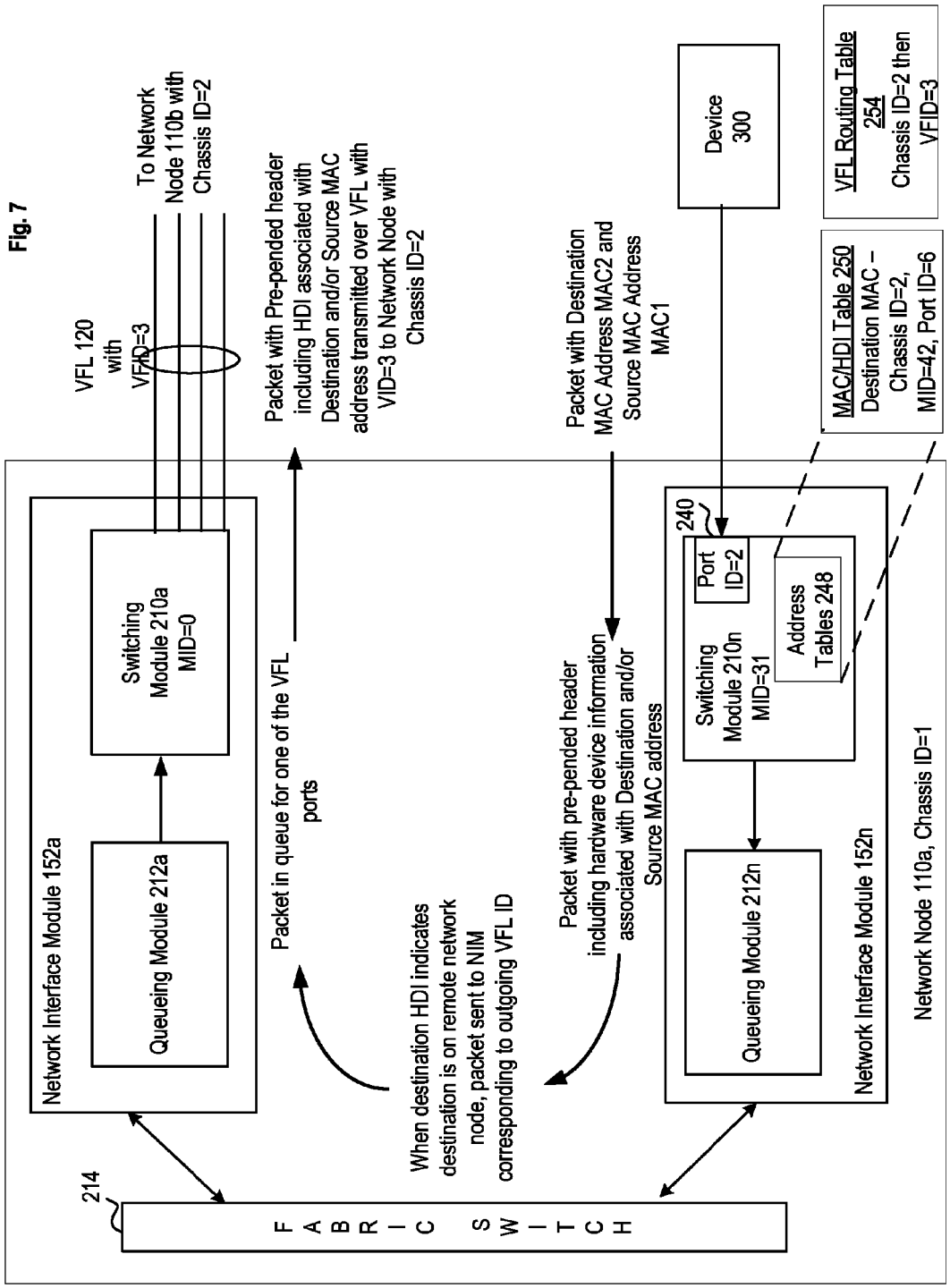

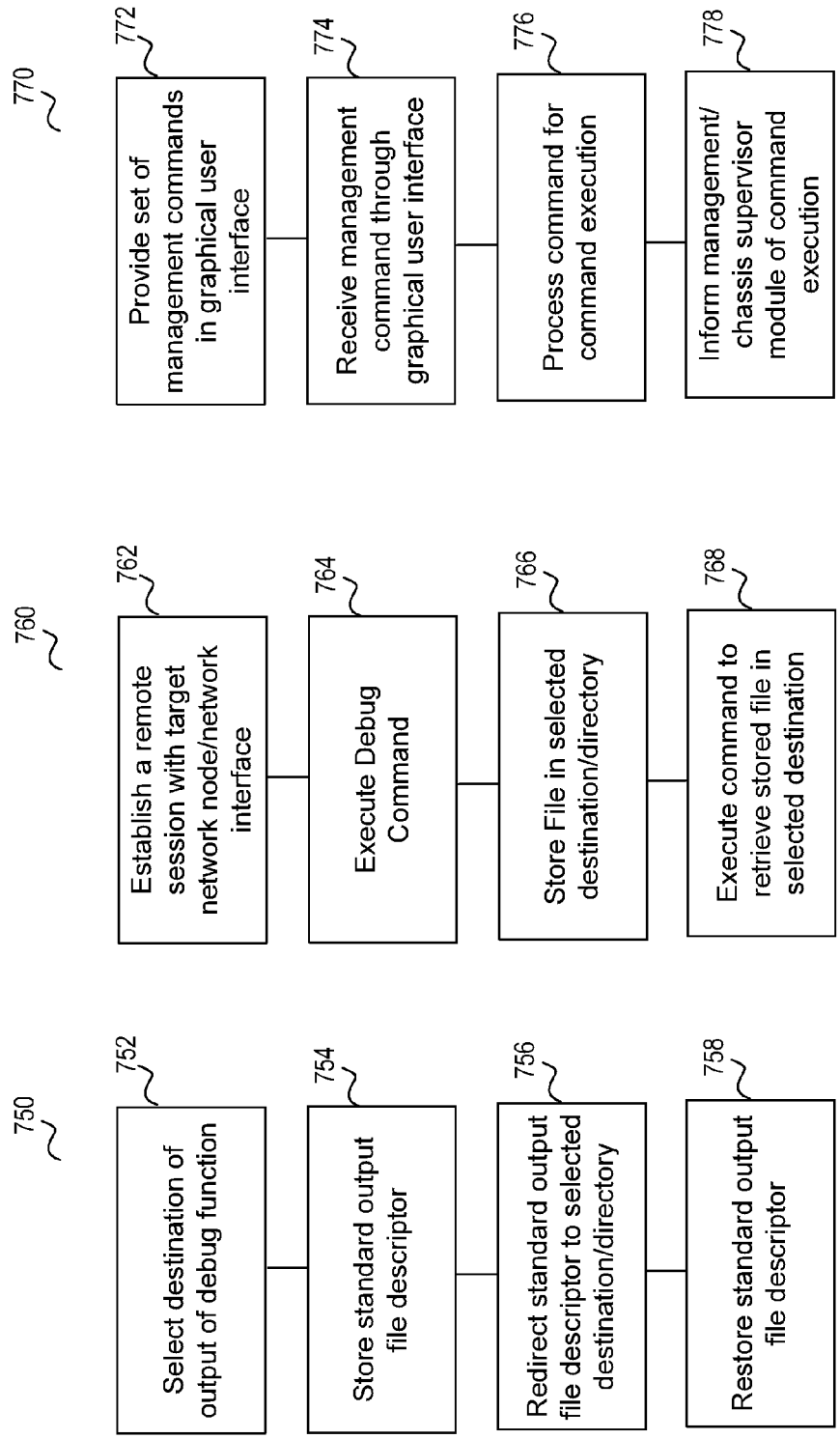

SYSTEM AND METHOD FOR A VIRTUAL CHASSIS SYSTEM

CROSS-REFERENCE TO RELATED PATENTS

The present U.S. Utility Patent Application claims priority as a continuation in part pursuant to 35 U.S.C. §120 to U.S. patent application Ser. No. 13/010,168, entitled, "SYSTEM AND METHOD FOR MULTI-CHASSIS LINK AGGREGATION," filed Jan. 20, 2011, now issued as U.S. Pat. No. 8,767,735, on Jul. 1, 2014, which is incorporated by reference herein and made part of the present U.S. Utility Patent Application for all purposes and which claims priority pursuant to 35 U.S.C. §119(e) to U.S. Provisional Application Ser. No. 61/370,622, entitled, "MULTICHASSIS VIRTUAL-FABRIC LINK AGGREGATION SYSTEM," filed Aug. 4, 2010, which is incorporated by reference herein and made part of the present U.S. Utility Patent Application for all purposes.

The present U.S. Utility Patent Application claims priority pursuant to 35 U.S.C. §119(e) to U.S. Provisional Application Ser. No. 61/658,159, entitled, "VIRTUAL CHASSIS WITH GENERIC NODE ARCHITECTURE AND TOPOLOGY," filed Jun. 11, 2012, which is incorporated by reference herein and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to data networks and in particular to systems and methods for providing topological redundancy and resiliency between nodes of one or more data networks.

2. Description of Related Art

Data networks include various computing devices, for example, personal computers, IP telephony devices or servers that communicate with each other and/or with various other network elements or remote servers attached to the network. For example, data networks may comprise, without limitation, Metro Ethernet or Enterprise Ethernet networks that support multiple applications including, for example, voice-over-IP (VoIP), data and video applications. Such networks regularly include interconnected nodes, commonly known as switches or routers, for routing traffic through the network.

One of the key challenges faced by data networks is the need for network resiliency, i.e., the ability to maintain high availability despite eventual component failures, link failures or the like, which is critical to providing satisfactory network performance. Network resiliency may be achieved in part through topological redundancy, i.e., by providing redundant nodes (and redundant components within nodes) and multiple physical paths between nodes to prevent single points of failure, and in part through L2/L3 protocols to exploit the redundancy upon occurrences of failures to converge upon alternate paths for switching/routing traffic flows through the network. As will be appreciated, detection and convergence times must occur quickly (advantageously, in less than one second) in networks to achieve seamless transition to the alternate paths. Various types of network topologies are implemented within a network to provide redundancy between network elements, such as a ring networks, partial mesh networks, full mesh networks, hub networks, etc. Convergence times and redundancy between network elements often varies depending on the type of network typology implemented in a network.

Architectures of network elements also vary and affect network resiliency. For example, various node architectures include single switching elements, stackable switching elements, multi-slot chassis based network elements, etc. In general, depending on cost and network needs, one of these types of node architectures is selected and implemented into one of the types of network topologies. However, once implemented, it is sometimes difficult to upgrade or transition from one type of network topology to another type of network topology. It is also difficult to transition from one type of node architecture to another type of node architecture within a network topology or to incorporate various types of node architectures within one network.

Accordingly, there is a need for systems and methods for providing resiliency between nodes having one or more different types of node architectures in one or more different types of network topologies.

BRIEF DESCRIPTION OF THE SEVERAL VIEWS OF THE DRAWINGS

FIG. 2 illustrates a logical flow diagram of an embodiment of a network topology discovery process in a virtual chassis system in accordance with the present invention;

FIG. 3 illustrates a schematic block diagram of an embodiment of topology database in a network node in a virtual chassis system in accordance with the present invention;

FIG. 5 illustrates a schematic block diagram of an embodiments of a network interface module of a network node in a virtual chassis system in accordance with the present invention;

FIG. 6 illustrates a schematic block diagram of an embodiment of a pre-pended header of a packet in the virtual chassis system in accordance with the present invention;

FIG. 7 illustrates a schematic block diagram of an embodiment of packet flow through a network node in a virtual chassis system in accordance with the present invention;

FIG. 20 illustrates a logic flow diagram of an embodiment of a method for redirection of an output of a remote debug module in accordance with the present invention;

FIG. 21 illustrates a logic flow diagram of an embodiment of a method for remote access of a network node in the virtual chassis system in accordance with the present invention; and FIG. 22 illustrates a logic flow diagram of an embodiment of a method for a management interface module in accordance with the present invention.

DETAILED DESCRIPTION OF THE INVENTION

The following standards are referred to in this application and are incorporated by reference herein: 1) the Link Aggregation Control Protocol (LACP) which was formerly clause 43 of the IEEE 802.3 standard added in March 2000 by the IEEE 802.3ad task force and is currently as incorporated in IEEE 802.1AX-2008 on Nov. 3, 2008; and 2) IEEE Std. 802.1Q, Virtual Bridged Local Area Networks, 2003 edition.

Figure 1A:
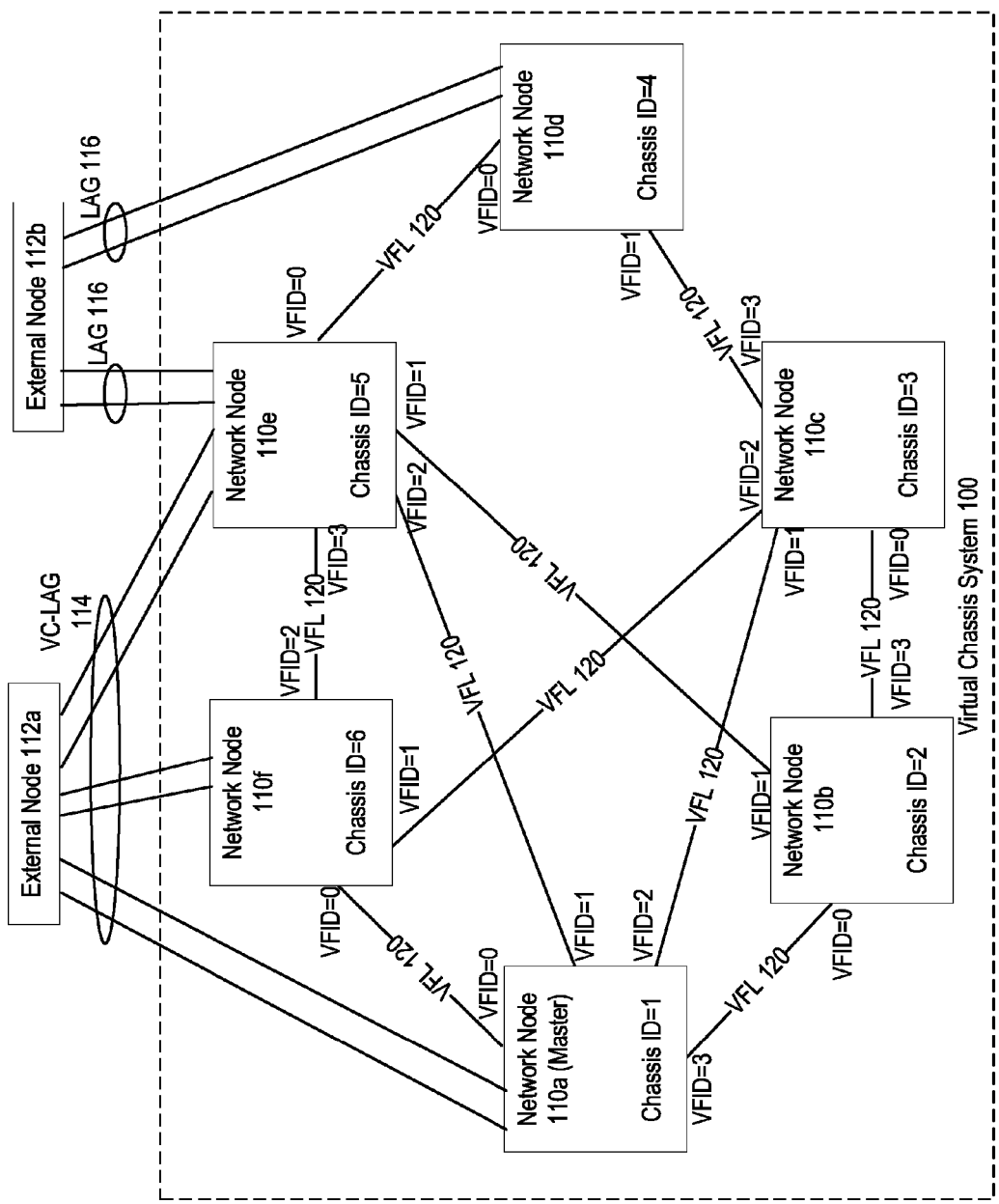
FIGS. 1a-c illustrate schematic block diagrams of embodiments of a virtual chassis system in accordance with the present invention.

FIG. 1a illustrates an embodiment of a virtual chassis system 100 including a plurality of network nodes 110 operably coupled by dedicated link aggregate groups for communicating control and addressing information called virtual fabric links (VFLs) 120. VFLs 120 and their operation are described in more detail in U.S. patent application Ser. No. 13/010,168, entitled, "SYSTEM AND METHOD FOR MULTI-CHASSIS LINK AGGREGATION," filed Jan. 20, 2011, pending, which is incorporated by reference herein and made part of the present U.S. Utility patent application for all purposes. The VFLs 120 provide connections between the network nodes 110 for exchange of information related to traffic forwarding, MAC addressing, multicast flows, address resolution protocol (ARP) tables, Layer 2 control protocols (e.g. spanning tree, Ethernet ring protection, logical link detection protocol), routing protocols (e.g. RIP, OSPF, BGP) and the status of the network nodes and external links.

In an embodiment, the plurality of network nodes 110 operate as a single virtual network node with unified management capabilities. A master network node, e.g. network node 110a, is selected and the local MAC address of the master network node 110 is adopted as the master MAC address for the virtual chassis system 100 by the other network nodes 110. The master MAC address is utilized by external nodes 112 to address the network nodes 110 in the virtual chassis system 100. As such, the network nodes 110 operate transparently to the external nodes 112 and are treated as a single logical device by the external nodes 112.

External nodes 112 are operable to couple to one or more network nodes 110 in the virtual chassis system 100 using a single trunk or link, a link aggregate group (LAG) 116 or virtual-chassis link aggregate groups (VC-LAG) 114. To provide increased resiliency and remove a single point or even two points of failure, VC-LAG 114 is operable to couple an external node to two or more network nodes 110 in the virtual chassis system 100. The external node can use load balancing techniques to distribute traffic across the available links of VC-LAG 114. For example, one of the physical links of the VC-LAG 114 is selected by the external node to transmit a packet based on a load-balancing algorithm (usually involving a hash function operating on the source and destination Internet Protocol (IP) or Media Access Control (MAC) address information) for a more effective use of bandwidth.

During normal operation, the network nodes 110 within the virtual-chassis system share the master MAC address for system identification by a wide variety of layer 2 and layer 3 protocols. For example, the spanning tree protocol and LACP protocols use the master MAC address as the identifier for the virtual chassis system 110. Internet Protocol (IP) routing also utilizes the master MAC address to identify the virtual chassis system 100 to external network elements in the network, e.g. peers use the master MAC address as the Ethernet destination address for packets destined to the virtual chassis system 100. As such, the network nodes 110 within the virtual chassis system 100 are viewed as a single logical node by external network nodes 112. In addition, the network nodes 110 within a virtual chassis system 100 are managed as a single node with a unified administration, operations and maintenance management system.

Since the network nodes 110 within a virtual chassis system 100 are treated as a single logical device by external nodes 112, the external nodes 112 are operable to actively forward traffic on all the links of the VC-LAG 114. This feature enables multiple homing of the external nodes 112 to the network nodes 110 without requiring spanning tree protocols between the external nodes and network nodes while still facilitating a carrier-grade detection and convergence time to edge uplink failures as well as network node 110 failures. Another advantage of the active forwarding mode of all the VC-LAG 114 uplinks to the virtual chassis system 100 is increased efficiency of the use of bandwidth of the VC-LAG 114 links.

Within the virtual chassis system 100, a network node 110 is assigned a globally unique identifier called a chassis identifier or chassis ID. The network node 110 assigns an internal VFL identifier (VFID) to each of its configured VFLs 120 within the virtual chassis system 100. Since the VFID for a VFL is utilized for internal identification and configuration of VFLs 120, a network node 110 may assign the same or a different VFID to a VFL 120 as assigned by another network node 110. The VFLs 120 provide a connection for exchange of information between the network nodes 110 regarding traffic forwarding, MAC addressing, multicast flows, address resolution protocol (ARP) tables, Layer 2 control protocols (e.g. spanning tree, Ethernet ring protection, logical link detection protocol), routing protocols (e.g. RIP, OSPF, BGP), as described in more detail in U.S. patent application Ser. No. 13/010,168, entitled, "SYSTEM AND METHOD FOR MULTI-CHASSIS LINK AGGREGATION," filed Jan. 20, 2011. In an embodiment, synchronization of layer 2 address tables, such as medium access control (MAC) address tables, between the network nodes 110 is driven by layer 2 packet flows over the VFLs 120 as well as by a periodic keep-alive mechanism whereby the network node 110 that owns a given MAC address floods specific packets bearing such MAC address as the source address. The synchronization mechanism also needs to implement the standard MAC flushing mechanism to handle cases where a network node 110 or some of its components go down. MAC address source learning is enabled over the VFLs 120 through flooding of unknown destination MAC addresses. During source learning, the network nodes 110 exchange packets with pre-pended headers over the VFLs 120 that include source MAC addresses and associated hardware device information, such as source chassis ID, source network interface identifier and source port identifier information. The network nodes 110 use this information to maintain synchronized MAC address tables with minimum messaging based MAC table synchronization. Utilizing the synchronized MAC address table, the network nodes 110 are operable to process and forward packets between the network nodes 110 in the virtual chassis system 100.

Figure 1B:
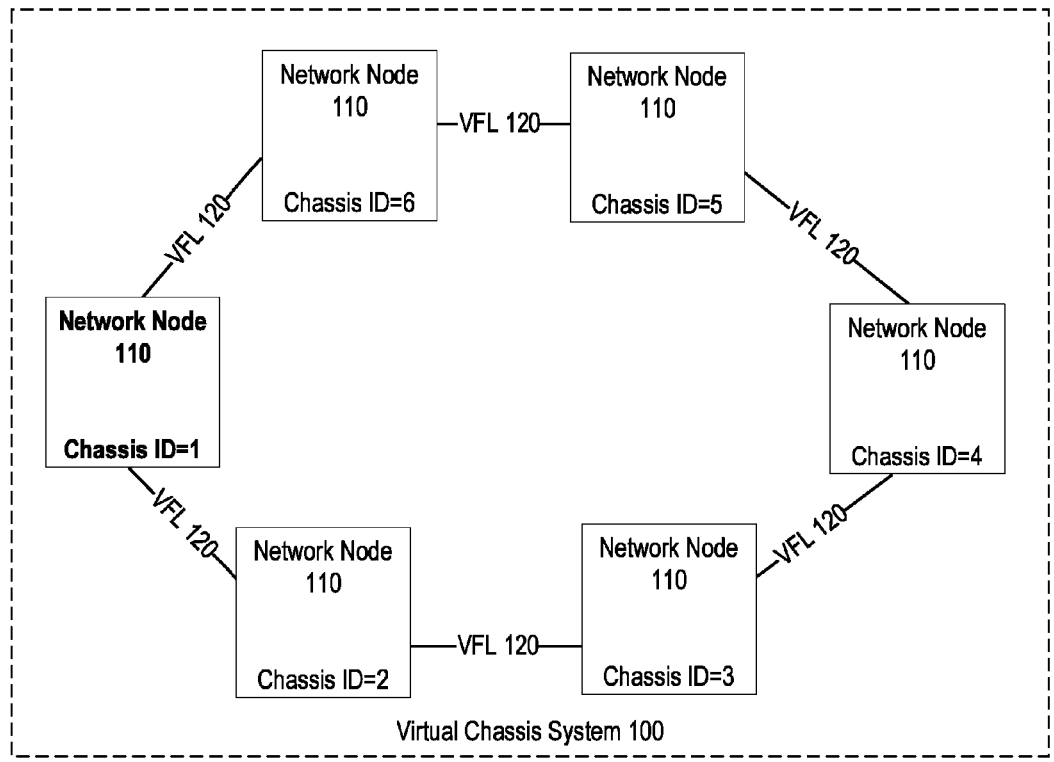
Figure 1C:
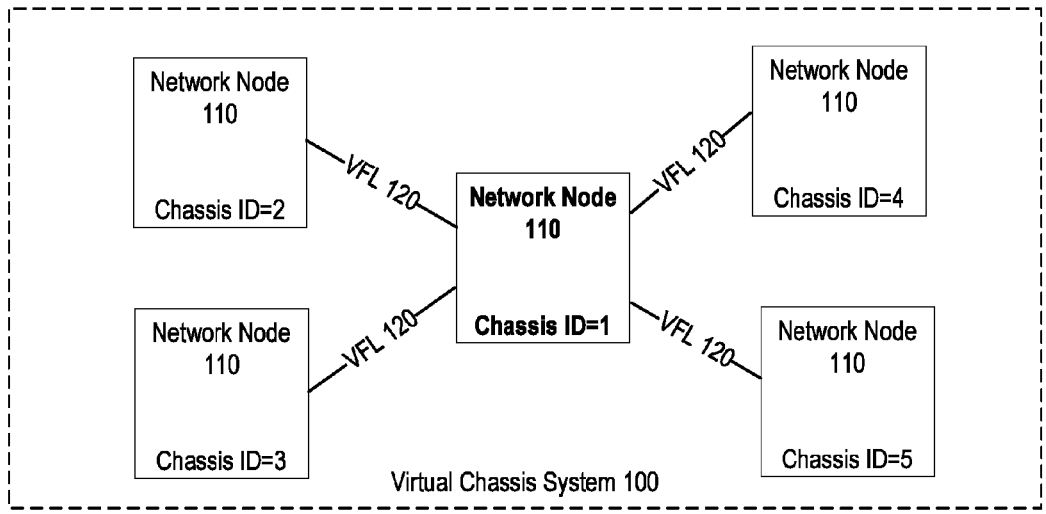

FIG. 1a illustrates that the network nodes 110 are coupled in a partial mesh network topology. However, the network nodes 110 in a virtual chassis system 100 may be coupled in any of a plurality of types of network topologies without affecting operation of the virtual chassis system 100. FIG. 1b illustrates a virtual chassis system 100 with a plurality of network nodes 110 configured in a ring network topology coupled by VFLs 120. FIG. 1c illustrates a virtual chassis system 100 with a plurality of network nodes 110 configured in a hub and spoke or star type network topology. Other network topologies not depicted, such as linear, tree, full mesh, hybrid, etc., are also be supported by the virtual chassis system 100. To support the plurality of different types of network topologies, the network nodes 110 in a virtual chassis system 100 are operable to perform a network topology discovery process.

FIG. 2 illustrates a logical flow diagram of an embodiment of a network topology discovery process 130 in a virtual chassis system 100. The process is performed by the active network nodes 110 in the virtual chassis system 100 at startup, reboot, on indication of a status change in the network or at predetermined time periods. In step 132, a network node 110 detects that it is operating in a virtual chassis mode. For example, one or more parameters of the network node 110 are configured to indicate a virtual chassis mode of operation. The network node 110 detects that the parameters indicate virtual chassis mode operation (e.g., rather than stand-alone mode or multi-chassis mode). The network node 110 then performs in step 134 one or more control protocols to discover other network nodes 110 in the virtual chassis system 100 and to exchange topology and configuration information. The network node 110 uses the information to build a topology database of the virtual chassis system 100. The topology database includes: identification information for the other network nodes 110 (e.g., local MAC address, chassis identifier), identification information for network interfaces that host active VFLs 120 (or other active inter-switch links), identification information for the VFLs 120 and their associated member ports on the network nodes 110. The network node 110 thus learns the active connections between the network nodes 110 and configuration information of the other network nodes 110 in the virtual chassis system 100. The following Table 1 is an example of a topology database for a network node 110a, in this example with e.g. chassis ID=1, following the discovery phase. Table 1 includes exemplary information stored in the topology database but other information and data not illustrated may also be included in the topology database. In addition, the topology database may be stored in separate databases or tables or combined with other tables or databases in the network node 110.

TABLE 1

Topology Database - Chassis 1

| Local Chassis Data | Neighbor [1] | Neighbor [2] | Neighbor [3] |
|---|---|---|---|
| Chassis ID = 1 | Chassis ID = 2 | Chassis ID = 4 | Chassis ID = 3 |
| Uptime = 4 min 50 sec | Uptime = 5 min 10 sec | Uptime = 5 min 5 sec | Uptime = 5 min 1 sec |
| Priority = 100 | Priority = 100 | Priority = 100 | Priority = 100 |
| Chassis MAC = A | Chassis MAC = B | Chassis MAC = D | Chassis MAC = C |
| Chassis Group = 0 | Chassis Group = 0 | Chassis Group = 0 | Chassis Group = 0 |
| Primary CMM = CMM-A | Primary CMM = CMM-A | Primary CMM = CMM-B | Primary CMM = CMM-A |
| Chassis type = OS10K | Chassis type = OS10K | Chassis type = OS10K | Chassis type = OS10K |
| Role = unassigned | Role = unassigned | Role = unassigned | Role = unassigned |
| State = unassigned | State = unassigned | State = unassigned | State = unassigned |

In step 136 of FIG. 2, a master network node is selected to perform management and other tasks for the virtual chassis system 100. The local MAC address of the master network node is then adopted by the other network nodes 110. The following Table 2 is an example of a topology database for the elected master network node 110 with chassis ID=1. As seen in Table 2, network node with chassis ID=1 is indicated as having the master role and the other nodes are indicated as having a slave role in the topology database.

TABLE 2

Topology Database - Chassis 1

| Local Chassis Data | Neighbor [1] | Neighbor [2] | Neighbor [3] |
|---|---|---|---|
| Chassis ID = 1 | Chassis ID = 2 | Chassis ID = 4 | Chassis ID = 3 |
| Uptime = 5 min 50 sec | Uptime = 6 min 10 sec | Uptime = 6 min 5 sec | Uptime = 6 min 1 sec |

TABLE 2-continued

Topology Database - Chassis 1

| Local Chassis Data | Neighbor [1] | Neighbor [2] | Neighbor [3] |
|---|---|---|---|
| Priority = 100 | Priority = 100 | Priority = 100 | Priority = 100 |
| Chassis MAC = A | Chassis MAC = B | Chassis MAC = D | Chassis MAC = C |
| Chassis Group = 0 | Chassis Group = 0 | Chassis Group = 0 | Chassis Group = 0 |
| Primary CMM = CMM-A | Primary CMM = CMM-A | Primary CMM = CMM-B | Primary CMM = CMM-A |
| Chassis type = OS10K | Chassis type = OS10K | Chassis type = OS10K | Chassis type = OS10K |
| Role = master | Role = slave | Role = slave | Role = slave |
| State = running | State = running | State = running | State = running |

The selection of a master network node 110 is based on a prioritized list of parameters including chassis priority, up time, chassis ID and chassis MAC address. The parameter of up time gives priority to network nodes 110 in operation for longer periods of time. The parameter of chassis priority is a user configured priority that defines the user preference of a master network node 110 regardless of chassis ID or up time. The use of various parameters adds flexibility to the selection of a master network node 110. The chassis group parameter shown in the topology database identifies the virtual chassis system 100. One or more additional virtual chassis systems 100 with different chassis group identifications may also be operable in a network. The topology database also identifies the active or primary control manager modules (CMM) in a network node 110 and the chassis type of the network node 110.

In step 138 of the network topology discovery process 130, the network node 110 performs one or more protocols to monitor the state or status of the connections and the network nodes 110 in the virtual chassis system 100. The current state of the network nodes 110 is maintained in the topology database. A detected status change in a network node 110 in the virtual chassis system 100 may initiate a change in routing, a change in the master node, etc. Through topology self-discovery and monitoring of the network nodes 110, the virtual chassis system 100 is operable to support a plurality of different types of network topologies with minimum pre-configuration and intervention.

FIG. 3 illustrates an example of topology databases 144 in network nodes 110 in a virtual chassis system 100 after selection of a master network node 110. In this example, network node 110a is adopted as the master network node and network nodes 110b and 110c are slave nodes. The local MAC address of network node 110a (e.g., master MAC address=A) is adopted by the network nodes 110a-c as the virtual chassis MAC address. In addition, the master MAC address (MAC=A) is adopted as the application MAC address for management applications.

Figure 4:
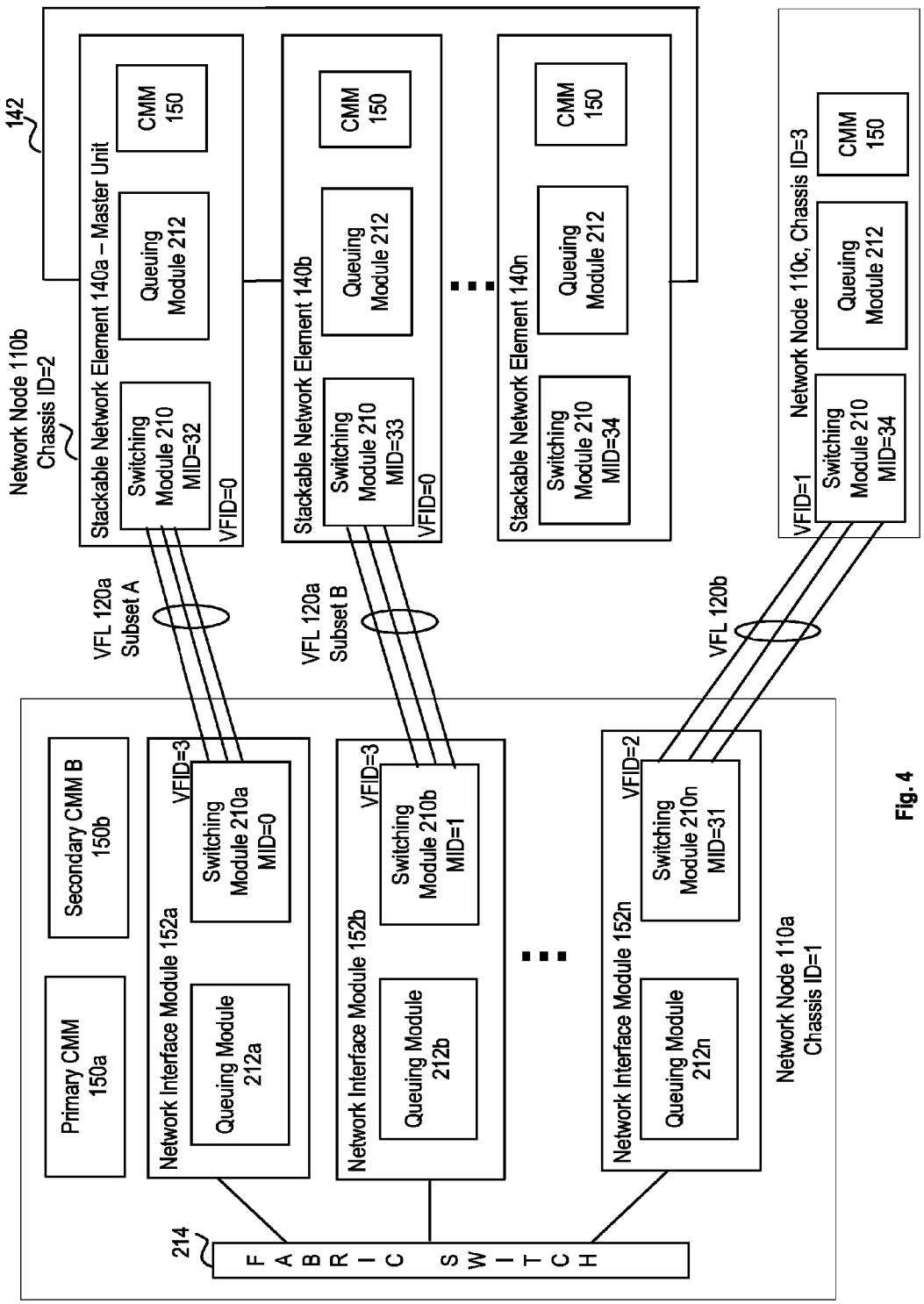
FIG. 4 illustrates a schematic block diagram of an embodiment of network nodes in a virtual chassis system in accordance with the present invention.

The virtual chassis system 100 is also operable to include network nodes 110 with one or more different types of node architectures, such as single module, stackable, or multi-slot chassis-based architectures. FIG. 4 illustrates a schematic block diagram of an embodiment of network nodes 110 in a virtual chassis system 100 with different types of node architectures. In this example, network node 110a has a multi-slot chassis-based architecture with a plurality of network interface modules 152a-n. In general, multi-slot chassis-based architectures share one enclosure, control manager modules (CMMs) 150a-b and a common power supply with one or more network interface modules (NIMs) 152a-n, such as line cards or port modules. The network interface modules 152n include a queuing module 212 and switching module 210 and are connected by a fabric switch 214 integrated into the backplane of the chassis.

Network node 110b in this example has a stackable node architecture and includes a plurality of network elements 140a-n coupled by backplane connections 142. Each network element 140a-n is operable as a stand-alone node and includes its own enclosure, control manager module (CMM) 150, switching module 210, queuing module 212 and power supply. In some stack architectures, one network element (Network Element 140a in this example) is designated as the main or master unit of the stack for management purposes.

Network node 110c has a single module node architecture, such as a single stackable element 140 or alternatively, a multi-slot chassis-based architecture with a single network interface module 152.

Network nodes 110a-c correspond to one or more of the network elements 110 in virtual chassis system 100 in FIGS. 1a-c. For example, virtual chassis system 100 is operable to include network nodes 110 with only multi-slot chassis-based node architectures or include network nodes 110 with only stackable node architectures or include a combination of network nodes 110 with two or more types of node architectures, such as multi-slot chassis-based architectures, stackable node architectures and single module node architectures. Though not shown, the virtual chassis system 100 may also include network nodes 110 comprised of other types of node architectures and configurations.

Network node 110a and network node 110b are operably coupled by VFL 120a. The network nodes 110a and 110b designate VFL 120a with an internal VFL identifier (VFID), such as VFID=3 for network node 110a and VFID=0 by network node 110b as shown in FIG. 3. Network node 110a and network node 110c are operably coupled by VFL 120b. The network nodes 110a and 110c designate VFL 120b with an internal VFL identifier (VFID), such as VFID=2 for network node 110a and VFID=1 by network node 110c as shown in FIG. 3. In addition, the network nodes 110a-c are also operable to be coupled by additional VFL 120s to one or more other network nodes 110 as shown in FIGS. 1a-c. The VFL 120a between network nodes 110a and 110b is described below as a generalization of the operation and configuration of the VFLs 120 between the various network nodes 110 in a virtual chassis system 100.

VFL 120a between network node 110a and network node 110b is operably coupled to one or more VFL member ports in one or more switching modules 210. For redundancy in case of failure of one or more ports, links or modules, VFL 120a is operable to include a plurality of aggregate links generated using the LACP or similar aggregate protocol between different switching modules 210 of the network nodes 110a and 110b. For example, in FIG. 4, VFL 120a includes a first subset A of physical links between NIM 152a of network node 110a and stackable network element 140a of network node 110b and a second subset B of physical links between NIM 152b of network node 110a and stackable network element 140b of network node 110b.

The network nodes 110 are assigned a unique chassis identifier in the virtual chassis system 100. The chassis ID for each network node 110 is unique and global and through the topology discovery, the network nodes 110 are aware of the chassis ID of its peer network nodes 110 in the virtual chassis system 100. In addition, unique hardware device identifiers or module identifiers (MIDs) for various components, such as the switching modules 210 and port interfaces in the network nodes 110, are generated allowing for management of local and remote objects. In an embodiment, the hardware device identifiers MIDs for the switching modules 210 have global significance within the virtual chassis system while MIDs for other components, such as queuing modules 212, may have only local significance. For example, the hardware device identifiers' assigned to the switching modules 210 are known by other network nodes 110 while hardware device identifiers for other devices are restricted to a local network node 110 and have no significance to other network nodes 110. For example, the port interfaces of a switching module 210 are assigned a global unique hardware device identifier that includes the chassis ID, switching module ID and port interface ID. In an embodiment, the network nodes 110 in the virtual chassis system operate in a pre-pended header mode to exchange data and control packets over the VFLs 120.

FIG. 5 illustrates a schematic block diagram of an embodiment of a network interface module (NIM) 152 operating in a prepended header mode in more detail. Though a network interface module 152 is illustrated, a stackable network element 140 or single module network element is operable to perform similar functions for operating in a prepended header mode. Switching module 210 includes a plurality of external ports 240 that are connected to external nodes 112 from the virtual chassis system 100. One or more of the external ports 240 may include member ports for a VC-LAG 114, LAG 116, single trunk or other trunk group, fixed link, etc. The external ports 240 may have the same physical interface type, such as copper ports (CAT-5E/CAT-6), multi-mode fiber ports (SX) or single-mode fiber ports (LX). In another embodiment, the external ports 240 may have one or more different physical interface types.

The external ports 240 are assigned external port interface identifiers (Port ID), e.g., device port values, such as gport and dport values, associated with the switching module 210. In an embodiment, the chassis ID of the network node 110, the MID of the switching module 210 and the external port interface identifier (Port ID) are used as a global unique identifier of a physical external port interface 240 in a network node 110 in the virtual chassis system 100. In another embodiment, globally unique module identifiers (MID) are assigned to the switching modules 210 of the network nodes 110 in the virtual chassis system based on the chassis identifiers. For example, switching MIDs 0-31 are assigned to chassis ID=1, switching MIDs 32-63 are assigned to chassis ID=2, etc. In this case, the globally unique switching MIDs and external port identifiers (Port ID) are used as a global unique identifier of a physical external port interface 240 in a network node 110 in the virtual chassis system 100.

When a packet is received on an external port 240, switching module 210 transfers the packet to a pre-pended packet header interface (PPHI) 246 that adds a pre-pended header (or otherwise modifies the packet header) to include hardware device information (HDI) associated with the source and/or destination MAC address of the packet. In an embodiment, the pre-pended header may include other information such as packet priority and load balance identifiers. To obtain HDI information associated with the MAC address of the packet, the PPHI performs a look-up process in MAC/HDI forwarding table 250. The MAC/HDI forwarding table 250 stored in the address table memory 248 includes a list of MAC addresses and associated hardware device information. The hardware device information uniquely identifies a network node 110, switching module 210 and/or a port interface 240 for routing the packet. The hardware device information includes, for example, chassis ID, MID of a switching module 210 and/or port interface ID of a port 240 associated with the destination MAC address. The MAC/HDI forwarding table 250 may include one or more tables, such as source trunk map, trunk bitmap table, trunk group tables, VLAN mapping table, etc. In an embodiment, the MAC/HDI forwarding table 250 or parts thereof may be located in the queuing module of the NIM 152 or other module as well.

Based on the topology database 144, a VFL routing configuration table 254 is generated at a network node 110 to determine routing of unicast traffic. The VFL routing configuration table 254 includes a chassis ID and an associated VFL ID (VFID). The VFID associated with the chassis ID identifies a VFL 120 in the virtual chassis system 100 for routing the packet to a network node 110 identified by the destination chassis ID. In another embodiment, when globally unique module identifiers (MID) are assigned to the switching modules 210 of the network nodes 110 in the virtual chassis system 100, the VFL routing configuration table 254 includes the globally unique MIDs and an associated VFL ID (VFID). In an embodiment, the VFL routing configuration table 254 is generated using a shortest path algorithm, traffic based algorithm or other type of routing algorithm. An example of VFL routing configuration tables 254 for the virtual chassis system 100 shown in FIG. 1a is illustrated below in Table 3.

TABLE 3

| Destination Chassis ID/MID | Outgoing VFL ID | Destination Chassis ID/MID | Outgoing VFL ID |
|---|---|---|---|
| VFL Routing Configuration on Chassis 1 | | VFL Routing Configuration on Chassis 2 | |
| 1 (MID = 0-31) | N/A (local) | 1 (MID = 0-31) | 0 |
| 2 (MID = 32-63) | 3 | 2 (MID = 32-63) | N/A (local) |
| 3 (MID = 64) | 2 | 3 (MID = 64) | 3 |
| 4 (MID = 65-97) | 2 or 1 | 4 (MID = 65-97) | 3 or 1 |
| 5 (MID = 98) | 1 | 5 (MID = 98) | 1 |
| 6 (MID = 99-115) | 0 | 6 (MID = 99-115) | 0 or 1 |
| VFL Routing Configuration on Chassis 3 | | VFL Routing Configuration on Chassis 4 | |
| 1 (MID = 0-31) | 1 | 1 (MID = 0-31) | 0 or 1 |
| 2 (MID = 32-63) | 0 | 2 (MID = 32-63) | 0 or 1 |
| 3 (MID = 64) | N/A (local) | 3 (MID = 64) | 1 |
| 4 (MID = 65-97) | 3 | 4 (MID = 65-97) | N/A (local) |
| 5 (MID = 98) | 3 or 2 | 5 (MID = 98) | 0 |
| 6 (MID = 99-115) | 2 | 6 (MID = 99-115) | 0 or 1 |
| VFL Routing Configuration on Chassis 5 | | VFL Routing Configuration on Chassis 6 | |
| 1 (MID = 0-31) | 2 | 1 (MID = 0-31) | 0 |
| 2 (MID = 32-63) | 1 | 2 (MID = 32-63) | 0 or 1 |
| 3 (MID = 64) | 1 or 0 | 3 (MID = 64) | 1 |
| 4 (MID = 65-97) | 0 | 4 (MID = 65-97) | 1 or 2 |
| 5 (MID = 98) | N/A (local) | 5 (MID = 98) | 2 |
| 6 (MID = 99-115) | 1 | 6 (MID = 99-115) | N/A (local) |

Though the MAC/HDI forwarding table 250 and VFL routing table 254 are illustrated as separate tables in address table memory 248, the tables may be combined or data included from one of the tables into the other table or the tables may be separated into one or more other tables.

In an embodiment, the hardware device information HDI in the pre-pended header of a packet includes the outgoing VFID for the VFL port 252 associated with the destination chassis ID, as shown in Table 3. The pre-pended header also includes hardware device information HDI associated with the source port receiving the packet, such as the port interface ID, MID of the switching module 210 and chassis ID. Additional information, such as VLAN ID, packet type (multicast, unicast, broadcast), packet priority and load balance identifier is also added to the pre-pended header in an embodiment.

The packet with the pre-pended header is then transmitted to the queuing module 212 for routing over the fabric switch 214. Based on the VFL routing configuration table 254, the queuing module 212 routes the packet with the pre-pended header to the switching module 210 connected to the outgoing VFL 120.

The queuing module 212 includes a packet buffer 260, a queue management 262 for providing traffic and buffer management and a global HDI address table 264. The global HDI address table 264 maps the outgoing VFL ID to the appropriate queues in queuing modules 212 in one or more of the other NIMs 152. For example, the queuing module 212 switches the packet to an appropriate egress queue for one or more of the VFL port interfaces 252 for transmission over the outgoing VFL 120. In an embodiment, a determination of the egress queue corresponding to a particular VFL port interface is operably based on a load balance identifier in the pre-pended header.

Though the switching module 210 and queuing module 212 are illustrated as separate integrated circuits or modules, one or more functions or components of the modules may be included on the other module or combined into an alternate module or otherwise be implemented in one or more integrated circuits.

FIG. 6 illustrates a schematic block diagram of an embodiment of a pre-pended header of a packet in the virtual chassis system 100. The pre-pended header 300 includes fields for source HDI 302, destination HDI 304, VLAN ID 306, packet type 308, source MAC address 310 and destination MAC address 312. In an embodiment, the pre-pended header may also include, load balance identifier 314 and packet priority 316. The destination HDI 304 includes, for example, the port identifier (either device port (dport) and/or global port value (GPV)), MID of switching module 210 and chassis ID of the destination network node 110 associated with the destination MAC address. The source HDI 302 includes, for example, the port identifier (either device port (dport) and/or global port value (GPV)), MID of switching module 210 and/or chassis ID of the source network node associated with the source MAC address. The load balance identifier 314 is utilized by the queuing module 212 to determine a VFL member port for transmission of the packet over the outgoing VFL 120. The packet priority 316 is utilized by the queuing module 212 to determine the specific priority queue.

FIG. 7 illustrates a schematic block diagram of an embodiment of a packet flow through a network node 110a to another network node 110b in a virtual chassis system 100. In this example, an external device 300 from the virtual chassis system 100 with source MAC address "MAC1" transmits a packet with a destination MAC address "MAC2". Network node 110a, with Chassis ID=1 in this example, receives the packet at external port interface 240, e.g. with port ID=2 on switching module 210n, e.g. with MID=31. The switching module 210n extracts the destination MAC address MAC2 and performs an address table look-up in MAC/HDI forwarding table 250 to determine hardware device information (HDI) associated with the destination MAC address MAC2. The destination HDI may include, e.g., destination chassis ID and device module identifier (MIDs) and port identifiers associated with the destination MAC address. The destination HDI may also include identifiers of one or more other network nodes or hardware modules in a path to the destination device associated with the destination MAC address. When the destination MAC address is associated with another network node, e.g. destination chassis ID is not the local chassis ID, the switching module 210 determines an outgoing VFL ID associated with the destination chassis ID. The outgoing VFL ID may be added to the destination HDI in the pre-pended header. For the example in FIG. 5, the VFL routing table 254 indicates that the destination chassis ID=2 is associated with VFL 120 having VFID=3.

The switching module 210n also includes in the prepended header source hardware device information (HDI) associated with the originating external port interface, e.g. port ID=2. The source HDI may include one or more hardware device identifiers, such as MID of the originating switching module 210, source port identifier, MID for source NIM 152, source chassis ID, etc. Furthermore, in an embodiment, the pre-pended header includes a packet priority and a load balance identifier determined based on parameters retrieved from the original packet (source MAC address, destination MAC address, source IP address, destination IP address).

The packet with pre-pended header is transmitted to the queuing module 212n which then determines a NIM 152 on the network node 110 to transmit the packet based on the destination HDI. When the destination HDI indicates a local external port interface on the network node (e.g. based on the destination MID contained in the pre-pended header), the queuing module places the packet in an egress queue for transmission to the corresponding NIM 152 of the local external port interface. In another example illustrated in FIG. 5, when the destination HDI indicates that the packet needs to be transmitted over a VFL 120 to another network node 110 in the virtual chassis system 100, the queuing module determines from the VFL ID the outgoing NIM 152 to transmit the packet. In this example, the queuing module determines that VFID=3 is operably coupled to NIM 152a and transmits the packet with pre-pended header over the fabric switch 214 to NIM 152a. When multiple switching modules 210 are operably coupled to the outgoing VFL 120, the traffic to be transmitted may be distributed between the multiple switching modules 210 in a load balancing method. In addition, the selection of a VFL member port (high priority queue, low priority, etc.) on a switching module 210 is operably based on load balance identifier parameters carried on the pre-pended header. The queuing module 212a on NIM 152a receives the packet with pre-pended header and queues the packet for transmission over VFL 120 with VFID=3. The switching module 210a then transmits the packet with pre-pended header including the source and/or destination HDI to the network node 110b, chassis ID=2 over the VFL 120 with VFID=3.

In an embodiment, the switching module 210a may alter the pre-pended header prior to transmission over the VFL 120. For example, the switching module 210a may translate a destination HDI with local significance (e.g., a gport value or local hardware device identifier MID) to an HDI with global significance or remove the outgoing VFID from the pre-pended header.

In an embodiment, the MAC/HDI forwarding tables 250 in the NIMs 152 are populated and updated in response to layer 2 packet flows through the virtual chassis system 100. Since the pre-pended header includes source MAC address and source HDI information, the NIMS 152, e.g. in specific the switching modules 210 in an embodiment, are able to populate the MAC/HDI forwarding table 250 with this information. By operating in a pre-pended header mode to exchange Layer 2 packets with source MAC addresses and source HDI over the VFL 120, the switching modules 210 are able to synchronize the MAC/HDI forwarding tables 250 between the network modules 110 in a virtual chassis system 100. Though the MAC/HDI forwarding table 250 and VFL routing table 254 are described as located in the switching modules 210, the tables may be included, alternatively or in addition to, in the queuing modules 212n or other module of the network node 110. In another embodiment, the CMM 150 (primary and secondary) may also include the MAC/HDI forwarding table 250 and VFL routing table 254.

Figure 8:
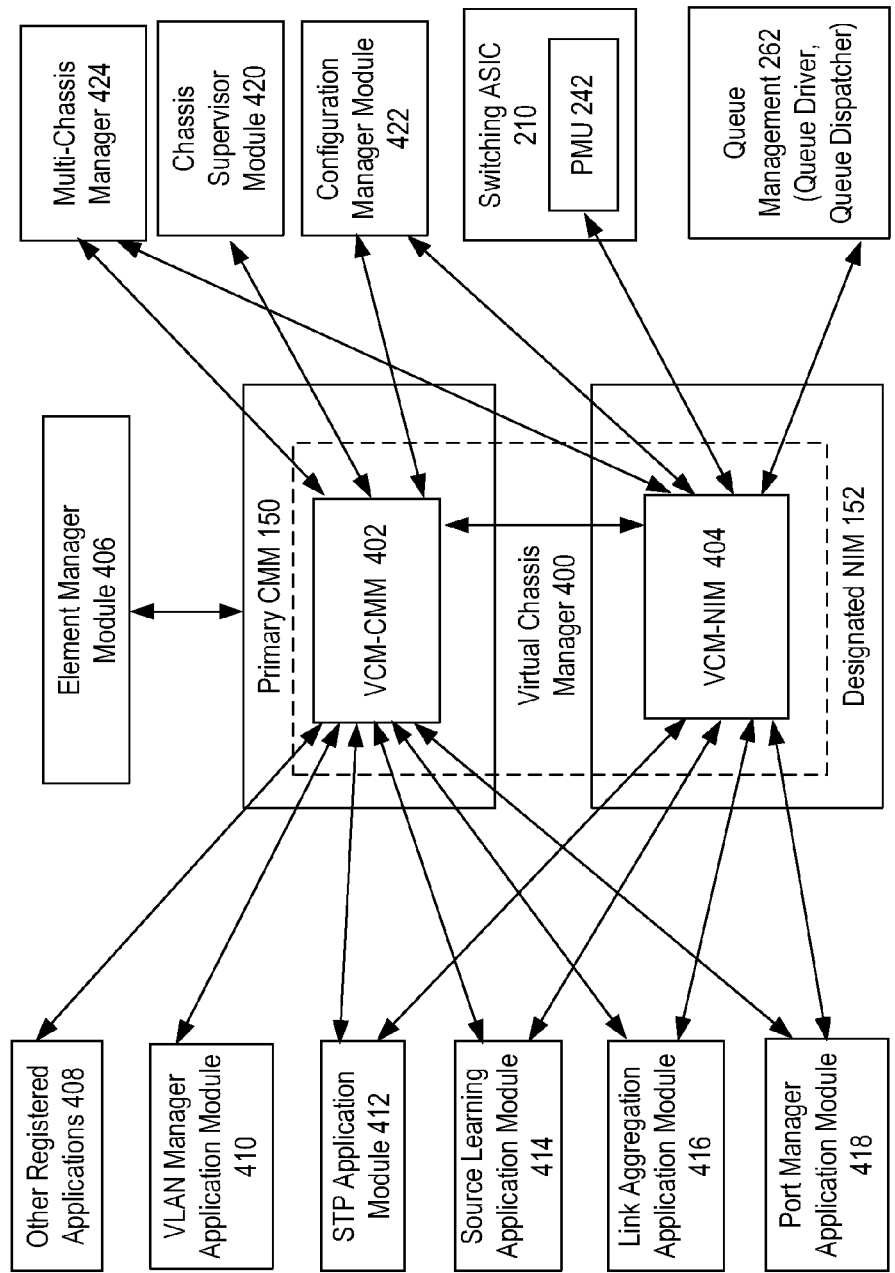
FIG. 8 illustrates a schematic block diagram of an embodiment of a virtual chassis manager application in accordance with the present invention.

FIG. 8 illustrates a schematic block diagram of an embodiment of a virtual chassis manager application or module 400 operable in the network nodes 110 in the virtual chassis system 100. In an embodiment of a network node 110 with a multi-slot chassis based node architecture, the virtual chassis manager module 400 includes a distribution of functionality between the central management module (CMM) 150 of the network node 110 (called VCM-CMM 402) and a processing module 266 in a designated network interface module (NIM) 152 of the network node (called VCM-NIM 404). In a stackable node architecture, a designated or master stackable network element 140 operates the VCM-NIM 404. Use of a designated NIM 152 or stackable element 140 avoids centralizing the functions of the VCM module 400 only at a CMM 150. An example of a distribution of functionality of the virtual chassis manager module 400 is shown in Table 4.

TABLE 4

| VCM-CMM 402 | VCM-NIM 404 |
|---|---|
| Element and network management interface to the virtual chassis functionality Coordination of the virtual chassis operation and states from a network node overview | Control protocol state machines Service interfaces with other software components, i.e. interfaces used by the VCM module 400 to provide or request services to/from other software components. Programming of the underlying switching module devices: global module identifiers (MID), loop prevention, virtual chassis inter-process communication infrastructure, VFL member port programming, etc. |

In an embodiment, the VCM-CMM 402 includes an interface between the virtual chassis manager module 400 and element and/or network manager module 406 as well as an interface to other applications 408 registered with VCM module 400 operable on the network node 110. The virtual chassis manager module 400 informs the registered applications 408 when to operate in the virtual chassis mode. More generally, the virtual chassis manager module 400 provides a wide range of notifications to inform interested applications about the status of the virtual chassis system both in the context of the local node and other network nodes 110 in the virtual chassis system 100. Some of the status information is driven by management configuration, whereas other status information is triggered by runtime decisions taken by the network node individually or by a plurality of the network nodes 110 within the virtual chassis system upon control data exchange, negotiation and agreement. The virtual chassis manager module 400 also interfaces with the VLAN Manager Application module 410, Spanning Tree Protocol (STP) application module 412, Source Learning application module 414, Link Aggregation application module 416 and Port Manager application module 418 for the purposes of requesting services from these system components. For example, the VCM 400 may request VLAN Manager to configure a VFL member port as a member of the control VLAN in order to allow the set-up of an inter-process communication channel between the network nodes 110 in the virtual chassis system 100.

The VCM-NIM 404 performs module identification configuration (e.g. MID) of hardware modules. The VCM-NIM 404 also interfaces with the queue management 262 in queuing modules 212 to perform hardware device/queue mapping functions and inter-chassis loop avoidance functions. The VCM-NIM 404 also includes virtual chassis state functionality for the control and management of the VFLs 120. Virtual Fabric Link Control manages and configures the VFLs 120 and interfaces with the port manager application module 418 to monitor and/or control the state of the VFLs 120 and their corresponding member ports. It also tracks and updates the status of the VFLs 120. The VCM-NIM 404 tracks the state of each VFL member port using the standard LACP protocol, or other similar protocol, along with the state of the link at the physical level. In addition to the LACP protocol, a virtual chassis status protocol performs periodic keep-alive checks (hello protocol) in order to check the status and/or operability of components running on the designated NIM on both virtual-chassis switches. All virtual chassis protocol packets must be assigned a high priority in the system to avoid false/premature failure detection because such a premature detection of failure may have a very disruptive effect in the system. By running the virtual chassis status protocol on a primary designated NIM 152, the back-up designated NIM module is able to assume control of the status protocol processing in the event of failure.

The VCM-CMM 402 and the VCM-NIM 404 register with port manager application module 418 to receive port state and link state events about the member ports and links of the VFLs 120. In another embodiment, the virtual chassis manager module 400 may include a port manager application module to monitor the port and link state of the VFLs 120. The virtual chassis manager module 400 tracks the operational state of VFLs 120 and processes events about the VFL status, i.e. aggregate created/deleted/up/down. The port manager application module 418 provides link state notifications to both the VCM-CMM 402 and VCM-NIM 404.

In an embodiment, a transport control protocol is implemented in a virtual chassis system 100 to transport control protocol packets between designated NIMs 152 or stackable network elements 140 of network nodes 110. The transport control protocol is operable in the network nodes 110 with different node architectures. For a multi-slot chassis based node architecture, a designated NIM 152 with a designated processing module 266 operates the transport control protocol, e.g. as part of the VCM-NIM 404. In a stackable node architecture, a designated or master stackable network element 140 operates the transport control protocol.

Chassis supervisor module 420 provides an interface to hardware of the network node 110 and controls monitoring and boot-up or restart of the various application modules, controls software reloads and software upgrades (such as in-service software upgrades ISSUs), providing a command line interface (CLI) for the element manager module 406 and controls access to status or image files of system of the network node 110. During virtual chassis mode, the chassis supervisor module 420 controls boot sequence, controls software reloads and ISSUs and provides an interface for accessing virtual chassis parameters.

Configuration manager module 422 is operable to convert operation of the network node 110 from a virtual chassis mode to a standalone mode or convert a network node 110 from a standalone mode to a virtual chassis mode. Configuration manager module is also operable to configure the virtual chassis manager module 400 and multi-chassis manager module 424. The operation of the configuration manager module 422 and operation states of a network node 110 are described in more detail below.

The network nodes 110 in a virtual chassis system 100 may operate in a plurality of operation modes, including virtual chassis mode, standalone mode and multi-chassis (MC-LAG) mode. Various parameters and configurations are modified depending on the operation mode. Table 5 illustrates the assignment of chassis IDs to network nodes 110 depending on the mode of operation.

TABLE 5

| Operation Mode | Minimum Chassis ID | Maximum Chassis ID |
| --- | --- | --- |
| Standalone | 0 | 0 |
| Multi-Chassis (MCLAG) | 1 | 2 |
| Virtual-Chassis | 1 | N |

In standalone mode, a network node 110 is operated as a single node and utilizes its configured local MAC address rather than a global Virtual Chassis MAC address. In multi-chassis mode, two network nodes are configured as virtual nodes whose MAC forwarding tables and ARP tables are synchronized, but they still operate as separate bridges and routers, each of them using their own local chassis MAC address, as described in more detail in U.S. patent application Ser. No. 13/010,168, entitled, "SYSTEM AND METHOD FOR MULTI-CHASSIS LINK AGGREGATION," filed Jan. 20, 2011. In virtual chassis mode as described herein, a plurality N of network nodes are configured as virtual chassis nodes in a virtual chassis system 100. A globally unique chassis ID from 1 to N is assigned to each of the plurality of network nodes in the virtual chassis system 100.

When a network node 110 operates in standalone mode, port identifiers and configurations follow a format: 0/<slot>/<port>, where the chassis ID equals "zero", slot identifies each Network Interface Module (NIM) 152 in a multi-slot architecture or stackable network element 140 and port is the port interface identifier. When a network node 110 operates in multi-chassis mode, port configurations follow a format: <chassis>/<slot>/<port>, where the chassis ID equals 1 or 2 and represents the operation/current/running chassis ID. When a network node 110 operates in virtual chassis mode, port configurations follow a format: <chassis>/<slot>/<port>, where the chassis ID is a number in the range 1, 2 . . . N and represents the operation/current/running chassis ID.

Figure 9:
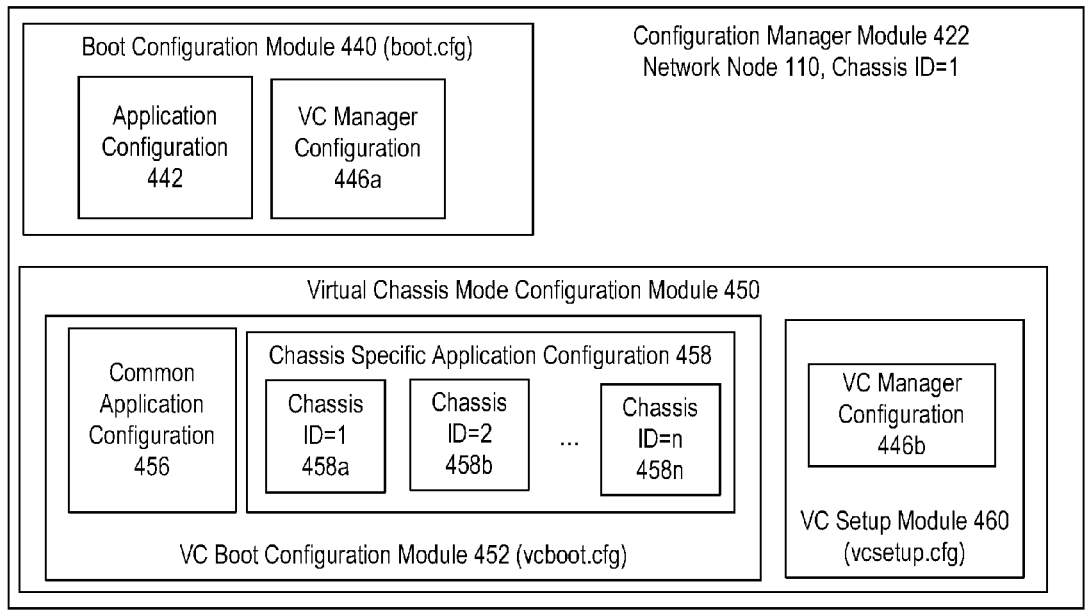
FIG. 9 illustrates a schematic block diagram of an embodiment of a configuration manager module in accordance with the present invention.

FIG. 9 illustrates a schematic block diagram of configuration manager module 422 in more detail. Configuration manager module 422 includes various configuration modules to support the different modes of operation of a network node 110. Boot configuration module 440 in an embodiment supports standalone and multi-chassis modes of operation. Virtual Chassis (VC) Mode configuration module 450 supports virtual chassis mode. The configuration manager module 422 reads and validates the relevant configuration files (boot configuration module 440 or VC mode configuration module 450) at start up and runtime depending on the mode of operation of the network node.

The boot configuration module 440 includes a set of management commands that define resources and specify the network node's parameters and functions in standalone or multi-chassis mode. The boot configuration module 440 includes the application configuration module 442 and the VC Manager configuration module 446a. The application configuration module 442 is used to control configuration of various applications in the network node 110. For example, the application configuration module 442 configures chassis supervisor module 420, VLAN manager application module 410, STP application module 412, multi-chassis manager 424, etc. The VC Manager configuration module 446a includes configuration parameters and control commands processed by the virtual chassis manager 400. The VC manager configuration module 446a is updated and utilized in the boot configuration module 440 when operating in standalone mode. Commands that are specific to the local network node and required to transition the network node to a virtual chassis mode are included in the VC manager configuration module 446a.

However, when operating in virtual chassis mode, the VC manager configuration module 446b in VC mode configuration module 450 is updated and utilized. By including the VC manager configuration modules 446a and 446b in the boot configuration module 440 and VC mode configuration module 450, the network node 110 is operable to perform virtual-chassis related configurations and functions while operating in multi-chassis mode or standalone mode or virtual chassis mode.

VC mode configuration module 450 includes a set of management commands that define resources and specify the network node's parameters and functions in virtual chassis mode. The VC Boot configuration module 452 includes the virtual chassis configurations 458a-n of the plurality of network nodes in the virtual chassis system 100 while the VC setup module 460 includes the local chassis configurations.

Figure 10:
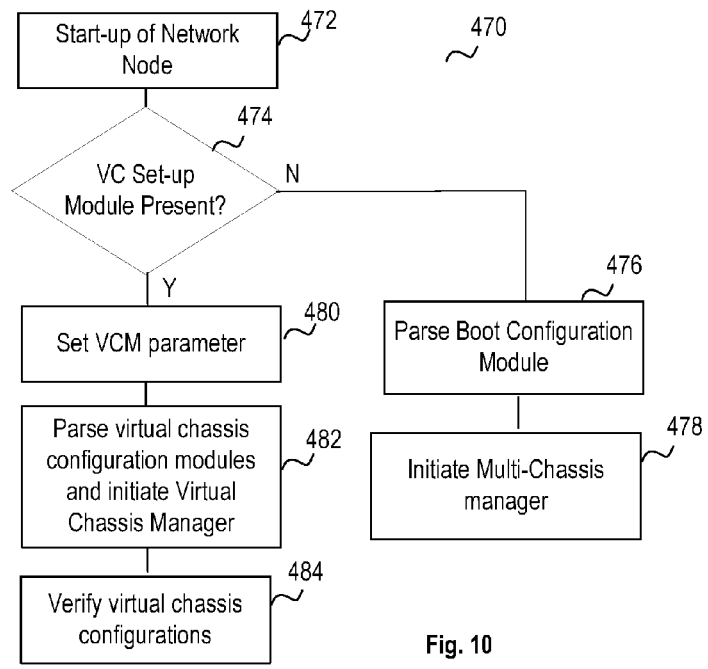
FIG. 10 illustrates a logical flow diagram of an embodiment of a method for determining an operation mode of a network node in a virtual chassis system in accordance with the present invention.

FIG. 10 illustrates a logical flow diagram of an embodiment of a method 470 for determining an operation mode of a network node 100 in a virtual chassis system 100. Chassis supervisor module 420 needs to determine the operation mode (e.g., virtual chassis, standalone or multi-chassis) of the network node 110 at start up prior to configuration because the operation mode determines whether the chassis supervisor module 420 will initiate the multi-chassis manager 424 or the virtual chassis manager 400. In step 472, the network node starts up and in step 474, chassis supervisor module 420 determines whether the VC setup module 460 (vcsetup.cfg) is present in the network node 110. When the VC setup module 460 (vcsetup.cfg) is not present, the network node is not operating in virtual chassis mode, and configuration manager module 422 parses the Boot Configuration Module 440 (boot.cfg file) in step 476 for operation in standalone or multi-chassis mode. The multi-chassis manager 424 is then initiated for processing of the Boot Configuration Module 440 (boot.cfg file) in step 4781.

When the VC setup module 460 (vcsetup.cfg) is present in step 474, the network node operates in virtual chassis mode, and chassis supervisor module 420 initiates virtual chassis manager 400. The chassis supervisor module 420 sets a parameter called "virtual chassis mode" in a shared memory file used by other applications during the start-up process in step 480 to indicate virtual chassis mode operation. The configuration manager module 422 then parses the virtual chassis configuration modules, VC setup module 460 (vcsetup.cfg) and VC boot configuration module (vcboot.cfg), and initiates the virtual chassis manager 400 in step 482. In step 484, the virtual chassis manager 400 confirms that the VC setup module 460 (vcsetup.cfg) includes valid virtual-chassis configurations (e.g, a valid chassis ID). Otherwise, the virtual chassis manager 400 informs the chassis supervisor module 420 that the virtual chassis mode has failed. The chassis supervisor module 422 then disables the port interfaces and VFL member ports. As such, a network node 110 that has a VC setup module 460 (vcsetup.cfg) file but its contents are invalid (e.g. out of range chassis ID, corrupted file, manually edited), will not become operational. No attempt is made to operate the network node 110 in standalone mode because, in some scenarios, this may create network problems due to conflicts between the standalone configuration and the virtual chassis configuration of another network node 110 in the virtual chassis system 100.

Figure 11:
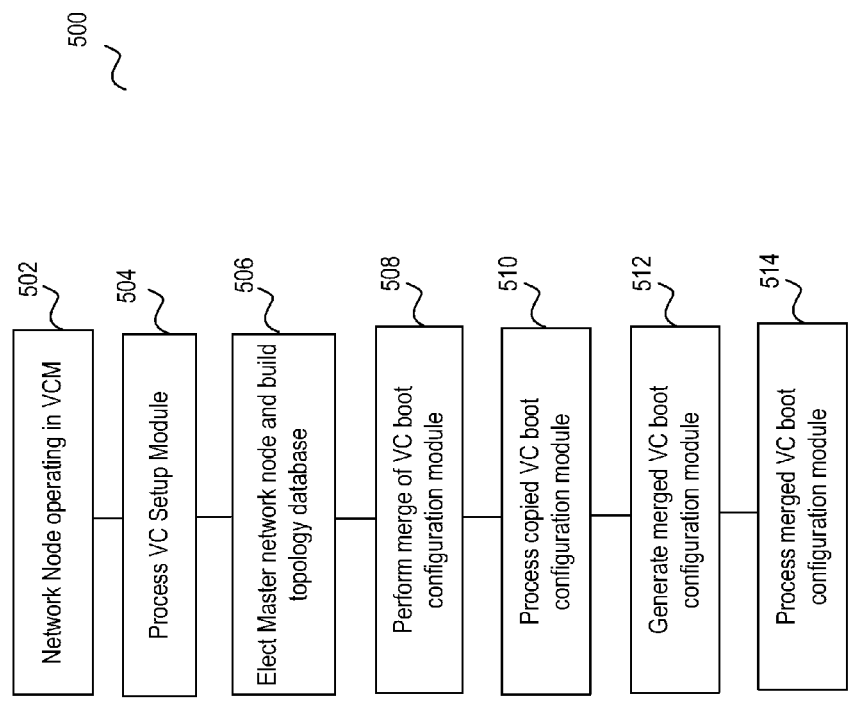
FIG. 11 illustrates a logic flow diagram of an embodiment of a method for configuring a network node at start-up in virtual chassis mode in accordance with the present invention.

FIG. 11 illustrates a logic flow diagram of an embodiment of a method 500 for configuring a network node 110 at start-up in virtual chassis mode. At system start up, when the network node 110 is determined to be operating in virtual-chassis mode in step 502 with valid configurations, the virtual chassis manager 400 processes configuration commands in the VC Setup Module 460 to transition the network node 110 into the virtual chassis system 100. In this initial phase, the virtual chassis manager 400 however does not process the VC boot configuration module 452 commands until a master network node 110 is known and topology database 144 is built by the network node 100. Table 6 below illustrates configuration of the network node 110 in this initial phase. Note that although Table 6 depicts only two network nodes, any number of network nodes is supported. The Runtime Configuration parameter in Table 6 illustrates the modules or set of commands processed by the network nodes 110 during this initial phase.

TABLE 6

| Chassis ID = 1 | Chassis ID = 2 |
| --- | --- |
| vcsetup1.cfg | vcsetup2.cfg |
| vcboot1.cfg | vcboot2.cfg |
| Runtime Configuration | Runtime Configuration |
| vcsetup1.cfg | vcsetup2.cfg |

After a master network node is elected and topology database is built in step 506, the second phase of configuration processing occurs. During the second phase, the master network node 110 in the virtual chassis system 100 performs a merge of the VC boot configuration module 452 in the master network node (e.g., vcboot1.cfg) and the slave network nodes (e.g., vcboot2.cfg) in step 508. When a network node fails to have the same set of designated configurations in its VC boot configuration module 452, then the slave network node retrieves the configurations from the master network node and overwrites its own files. The slave network node may then need to reboot so that the new set of parameters takes effect. When the designated configurations of the VC boot configuration module 452 are copied, the copied VC boot configuration module 452 (e.g., vcboot1.cfg) is then processed by the slave network nodes in step 510. Table 7 illustrates the configuration of the network nodes during the second phase.

TABLE 7

| Chassis ID = 1 (Master) | Chassis ID = 2 (Slave) |
| --- | --- |
| vcsetup1.cfg | vcsetup2.cfg |
| vcboot1.cfg | vcboot1.cfg |
| Runtime Configuration | Runtime Configuration |
| vcsetup1.cfg + vcboot1.cfg | vcsetup2.cfg + vcboot1.cfg |

The VC boot configuration module 452 of the master network node (vcboot1.cfg) has now been copied to the slave network node 2. To preserve the configurations from the slave network node, the master network node parses the configuration commands in the slave network node's VC boot configuration module (vcboot2.cfg). The parsing may be performed offline or by an element manager or network manager. The conflicting commands in the slave's VC boot configuration module (vcboot2.cfg) are determined and are saved for analysis. The master network node eliminates the conflicting commands and writes the non-conflicting commands into a merged VC boot configuration module 452 (vcboot2'.cfg) for the slave network nodes in step 512.

In a final stage, the merged VC boot configuration module 452 (vcboot2'.cfg) is copied to the slave network nodes in the virtual chassis system. The VC boot configuration module 452 is then executed by the network nodes 110 in step 514. Table 8 illustrates the configuration of the network nodes 110 after this final phase.

TABLE 8

| Chassis ID = 1 (Master) | Chassis ID = 2 |
| --- | --- |
| vcsetup1.cfg | vcsetup2.cfg |
| vcboot1.cfg | vcboot2.cfg |
| Runtime Configuration | Runtime Configuration |
| vcsetup1.cfg + vcboot1.cfg + vcboot2'.cfg | vcsetup2.cfg + vcboot1.cfg + vcboot2'.cfg |

As a result, the configuration of the slave network nodes 110 are utilized except for conflicting commands without a need to reboot each slave network node 110. In addition, the configuration of the slave network nodes 110 is preserved.

Figure 12:
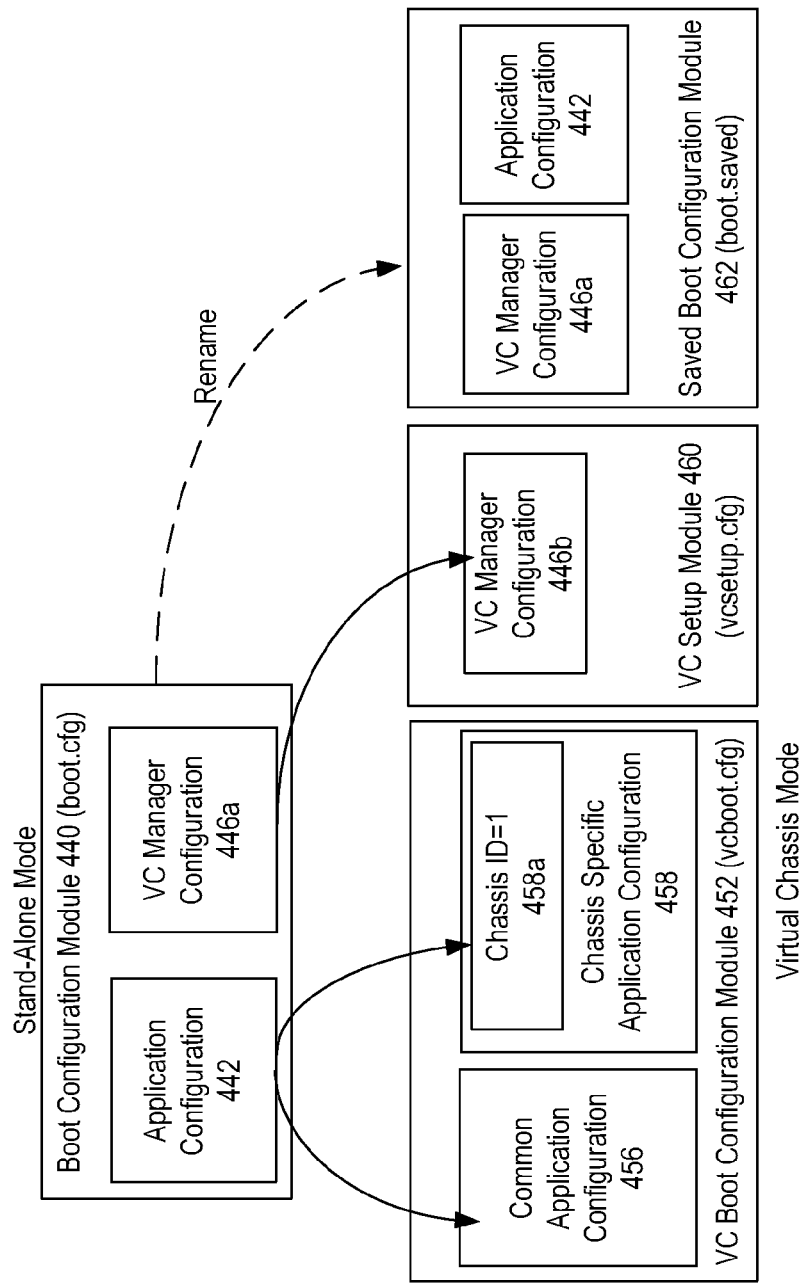
FIG. 12 illustrates a schematic block diagram of an embodiment of configuration conversion from standalone to virtual-chassis mode in accordance with the present invention.

FIG. 12 illustrates a schematic block diagram of an embodiment of configuration conversion from standalone to virtual-chassis mode. The configuration parameters of a network node 110 need to be converted when transitioning from standalone mode to virtual chassis mode. For example, parameter conversion from standalone to virtual-chassis mode requires modifying port configuration formats from 0/<slot>/<port> to <chassis>/<slot>/<port>. To transition a network node 110 in standalone mode, the network node 110 is configured with certain virtual chassis parameters in VC Setup Module 460 (vcsetup.cfg). For example, element manager module 406 transmits commands (such as through a command line interface) to configure the network node with the virtual chassis parameters. These virtual chassis parameters include, e.g., chassis ID, chassis group, chassis priority, VFL link creation and configuration. Element manager module 406 then enters a convert configuration command that initiates conversion of configurations by the configuration manager module 422. The configuration manager module 422 converts parameters from the Boot Configuration Module 440 to the VC Boot Configuration Module 452 and VC Setup Module 460 as shown in FIG. 12. The Boot Configuration Module 440 may need to be resaved or renamed (e.g., Saved Boot Configuration Module 462) when the module is currently running in standalone mode.

Figure 13:
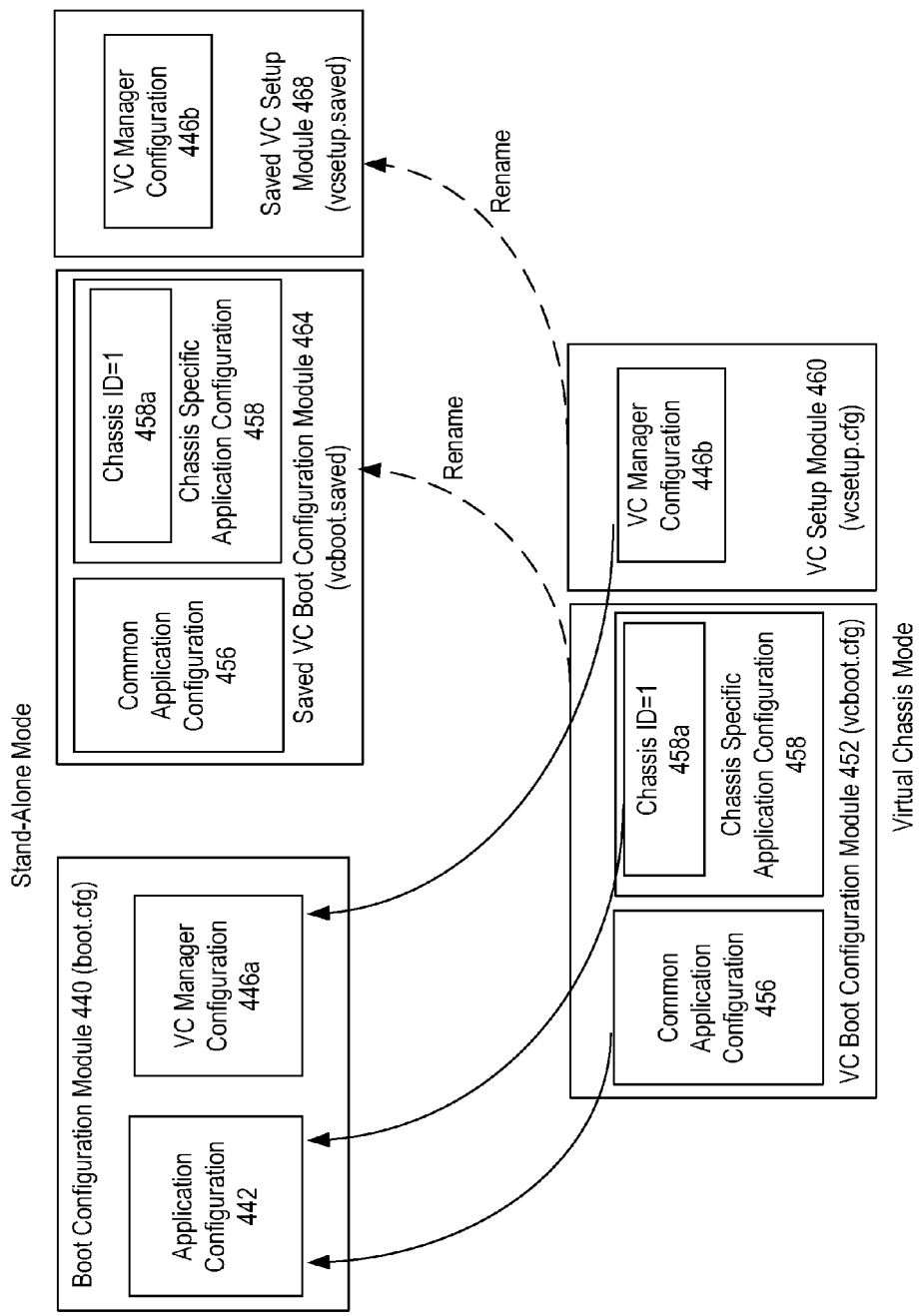
FIG. 13 illustrates a schematic block diagram of an embodiment of configuration conversion from virtual-chassis mode to standalone mode in accordance with the present invention.

FIG. 13 illustrates a schematic block diagram of an embodiment of configuration conversion from virtual-chassis mode to standalone mode. The configuration of a network node 110 needs to be converted when transitioning from standalone mode to virtual chassis mode. For example, configuration conversion from standalone mode to virtual chassis mode requires modifying port configuration formats from <chassis>/<slot>/<port> to 0/<slot>/<port>. Element manager module 406 enters a convert configuration command that initiates conversion of configurations by the configuration manager module 422 to standalone mode. The configuration manager module 422 converts parameters from the VC Boot Configuration Module 452 and VC Setup Module 460 to the Boot Configuration Module 440 as shown in FIG. 13. The VC Boot Configuration Module 452 and VC Setup Module 460 may need to be resaved or renamed (e.g., Saved VC Boot Configuration Module 464 and Saved VC Setup Module 468) when the modules are currently running in standalone mode.

In a virtual chassis system 100, when failures are detected in the master network node 110, its status may be changed from an active to an inactive state. Such failures include, e.g. a power-off, inability to communicate by the CMM or other modules of the master network node or failure of VFL 120 links coupled to the master network node. Upon occurrence of a failure, the remaining active network nodes elect a new master network node. In an embodiment, the remaining active network nodes retain the master MAC address of the failed master network node. In another embodiment, the remaining active network nodes adopt the local MAC address of the newly elected master network node as the new Virtual Chassis MAC address of the virtual chassis system 100.

Figure 14:
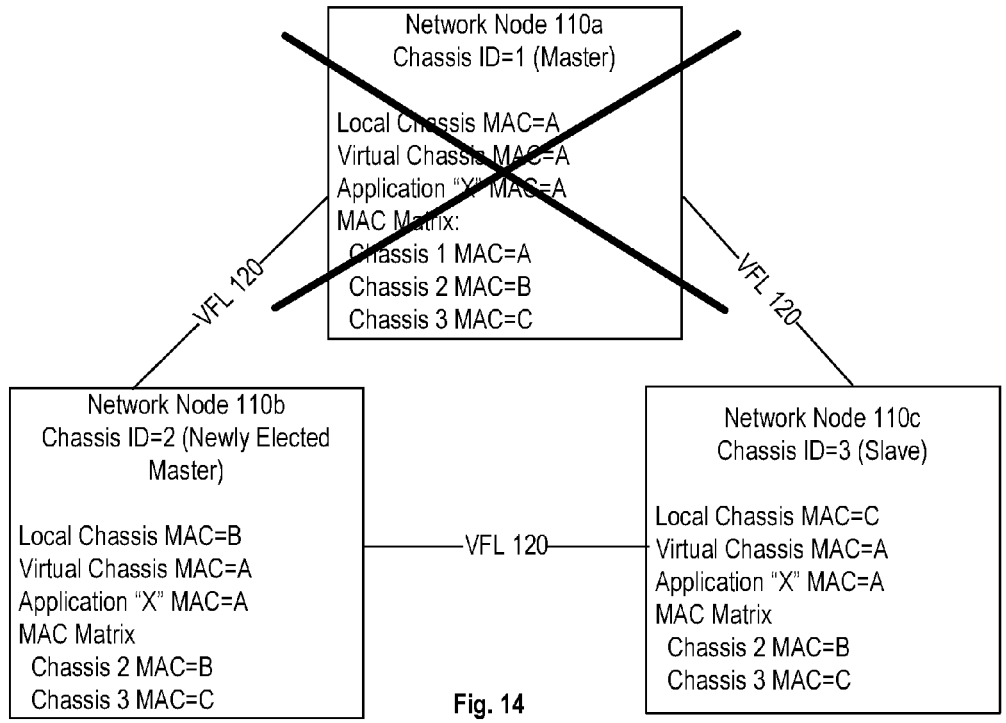
FIG. 14 illustrates a schematic block diagram of an embodiment of master address retention in a virtual chassis system in accordance with the present invention.

FIG. 14 illustrates a schematic block diagram of an embodiment of master address retention in a virtual chassis system 100. Due to a malfunction or schedule power down maintenance or an inoperable VFL 120 link or other failure, master network node 110a is not able to communicate with the remaining nodes 110b, 110c in the virtual chassis system 100. The remaining network nodes 110b and 110c elect a new master network node, in this example, network node 110b. In this embodiment, the remaining network nodes 110b and 110c retain the MAC address of the prior master network node 110a as the virtual chassis MAC address for the virtual chassis system 100. However, the prior master network node 110a is removed from the topology database 144 and MAC matrix of the remaining active network nodes 110b and 110c. This embodiment is termed master MAC retention due to the retention of the prior master MAC address as the virtual chassis MAC address by the remaining active network nodes 110.

Figure 15:
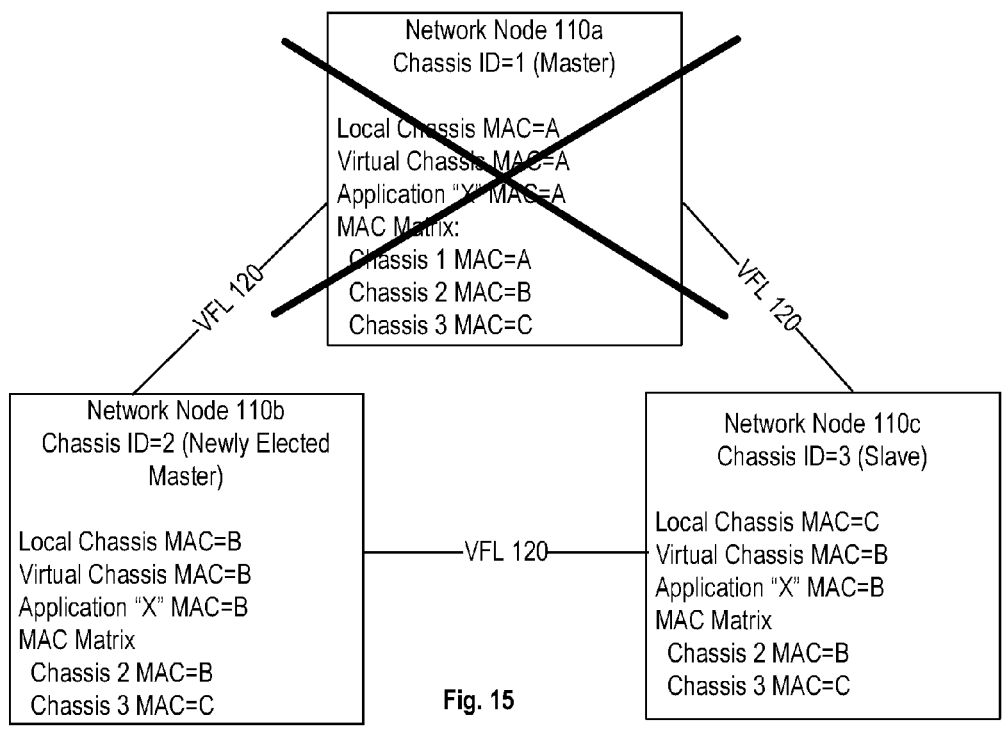
FIG. 15 illustrates a schematic block diagram of an embodiment of master address release in a virtual chassis system in accordance with the present invention.

FIG. 15 illustrates a schematic block diagram of an embodiment of master address release in a virtual chassis system 100. Due to a malfunction or schedule power down maintenance or an inoperable VFL 120 link or other failure, master network node 110a is not able to communicate with the remaining nodes in the virtual chassis system 100. The remaining network nodes 110b and 110c elect a new master network node, in this example, network node 110b. In this embodiment, the remaining network nodes 110b and 110c release the MAC address of the prior master network node 110b as the virtual chassis MAC address. The remaining active network nodes 110b and 110c adopt the local MAC address of the newly elected master network node 110b as the virtual chassis MAC address for the virtual chassis system 100. The prior master network node 110a is removed from the topology database and MAC matrix of the remaining active network nodes 110b and 110c. This embodiment is termed master MAC release due to the release of the inactive prior master MAC address as the virtual chassis MAC address.

The remaining network nodes 110 determine to retain or release the MAC address of the inactive master network element based on one or more factors. For example, one factor is whether the MAC retention function is administratively enabled. Another factor is whether the change in status of the master network node causes a split in the virtual-chassis system, e.g. the master network node and/or one or more other nodes are still operating using the MAC address of the failed prior master network node. A monitoring protocol or other type of control protocol is used to determine the topology before and after the failure of the master network node to determine whether a split in the virtual chassis system has occurred. When a split in the virtual chassis system has occurred, e.g., the newly elected master network node determines that the prior master network node is still operating, it releases the prior master MAC address as the virtual chassis MAC address. The newly elected master network node may also transition the user ports to a blocking state to prevent duplicative operation of two MAC addresses as the virtual chassis MAC address.

Figure 16:
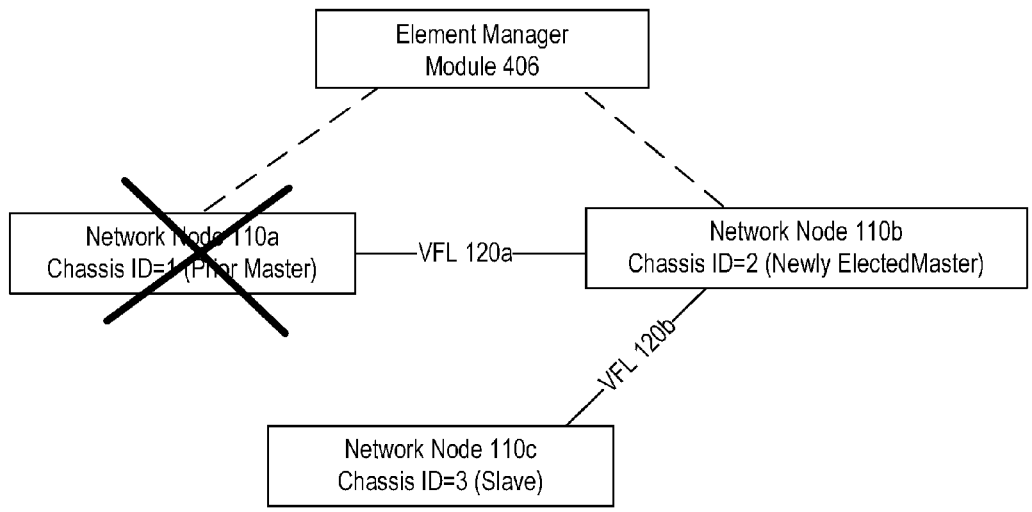
FIG. 16 illustrates a schematic block diagram of an embodiment of master network node failure in a virtual chassis system in accordance with the present invention.

FIG. 16 illustrates a schematic block diagram of an embodiment of master network node failure in a virtual chassis system 100. In this example, the master network node 110a fails and is inoperable. The newly elected master network node 110b attempts to determine the status of the prior master network node 110a by performing one or more protocols (Hello protocol, ping, etc.) or may request a status update of the network node 110a from element manager module 406. The newly elected master network node 110b attempts to distinguish between a failure of the VFL link 120a or a failure of the prior master network node 110a. When newly elected master network node 110b determines that a failure of the prior master network node 110a has occurred, e.g. it is no longer operable, the newly elected master network node 110b retains the MAC address of the prior master network node 110a as the virtual chassis MAC address as shown in FIG. 14. When the prior master network node 110a is removed from the active topology database 144 and the newly elected master network node 110b retains the prior master's MAC address, chassis supervisor module 420 starts a MAC retention timer. The MAC retention timer is configurable and sets a predetermined time period for the prior master network node 110a to reset and become active. Upon expiration of the predetermined time period, a warning message is generated by the newly elected master network node 110b if the prior master network node 110a is still inoperable. The virtual chassis system manager may determine to issue a user command to release the retained MAC address and adopt the local MAC address of the newly elected master network node 110b as the virtual chassis MAC address for the virtual chassis system 100.

Figure 17:
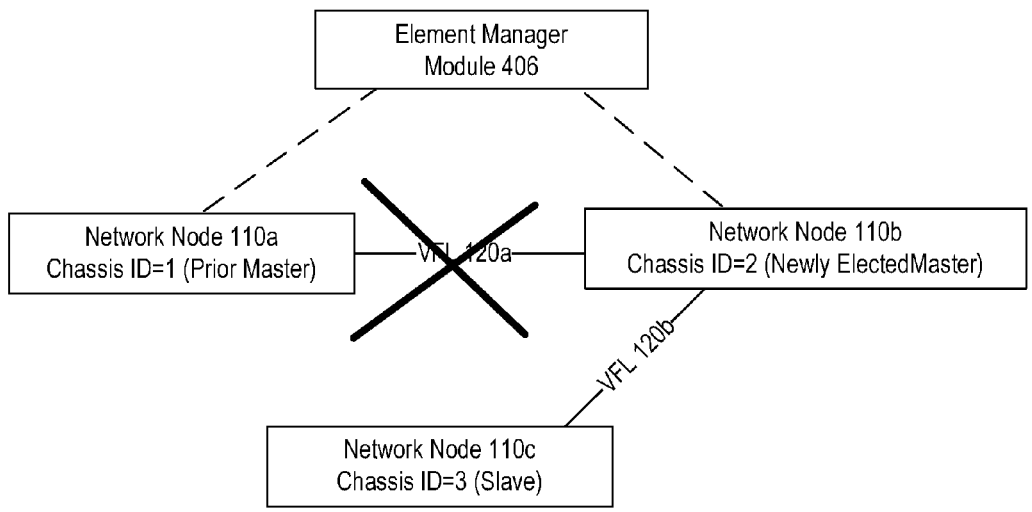
FIG. 17 illustrates a schematic block diagram of an embodiment of VFL failure in a virtual chassis system in accordance with the present invention.

FIG. 17 illustrates a schematic block diagram of an embodiment of VFL failure in a virtual chassis system 100. In this example, the VFL 120a coupled to the master network node 110a fails while prior master network node 110a remains operable. The newly elected master network node 110b attempts to determine the status of the prior master network node 110a by performing one or more protocols (Hello protocol, ping, etc.) or may request a status update of the network node 110a from element manager module 406. The newly elected master network node 110b attempts to distinguish between a failure of the VFL link 120a or a failure of the prior master network node 110a. When newly elected master network node 110b determines that a failure of the VFL 120a has occurred but that the prior master network node 110a is operable, the newly elected master network node 110b releases the MAC address of the prior master network node 110a as shown in FIG. 15. The remaining active network nodes 110b and 110c adopt the local MAC address of the newly elected master network node 110b as the virtual chassis MAC address for the virtual chassis system 100. In addition, the newly elected master network node 110b transitions user ports to a blocking state to prevent duplicative operation of two MAC addresses as the virtual chassis MAC address. The release of the MAC address of the prior master network node 110a also affects other layer 2 and layer 3 services. For example, spanning tree protocol and LACP may need to reconfigure and/or restart while layer 3 packets may need to be transmitted to neighboring nodes in response to the MAC address change.

Figure 18:
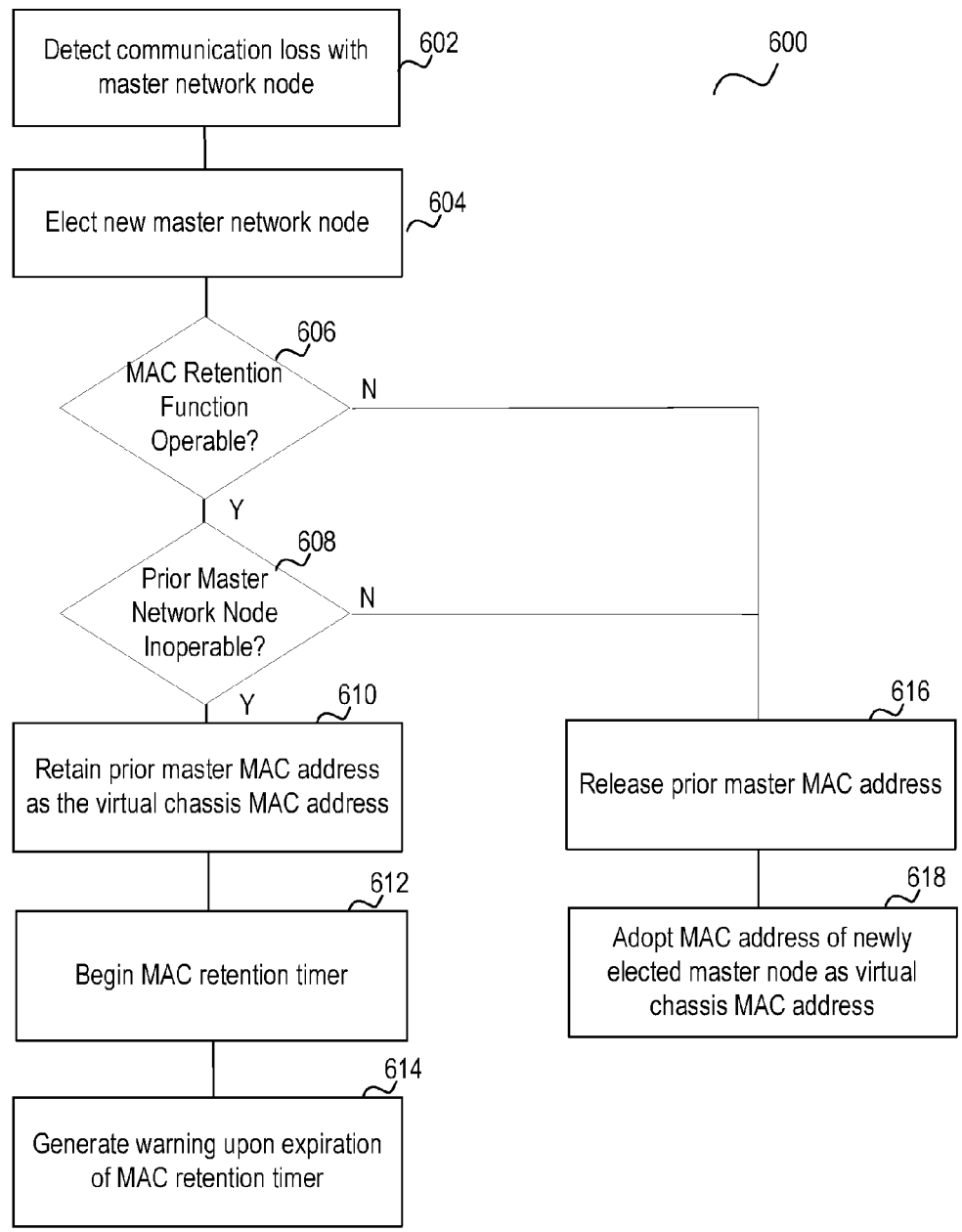
FIG. 18 illustrates a logic flow diagram of an embodiment of a method for recovery from a failure of a master network node in a virtual chassis system in accordance with the present invention.

FIG. 18 illustrates a logic flow diagram of an embodiment of a method 600 for recovery from a failure of a master network node in a virtual chassis system 100. In step 602, due to a malfunction or schedule power down maintenance or an inoperable VFL 120 link or other failure, communication loss is detected with the master network node in the virtual chassis system 100. The remaining network nodes in the virtual chassis system elect a new master network node in step 604. In step 606, the newly elected master network node determines whether a MAC retention function is enabled. If so, in step 608, the newly elected master network node determines whether the failure causes a split in the virtual-chassis system, e.g. the master network node is inoperable or still operating using its master MAC address. When the master network node is determined to be inoperable, the remaining network nodes retain the MAC address of the prior master network node 110a as the virtual chassis MAC address for the virtual chassis system 100 in step 610. In step 612, a MAC retention timer begins to time a predetermined time period. Upon expiration of the predetermined time period in step 614, a warning message is generated by the newly elected master network node if the prior master network node 110a is still inoperable.

When the newly elected master network node determines that the prior master network node is still operating in step 608 or that a MAC retention function is disabled in step 606, it releases the MAC address of the prior master network node as the virtual chassis MAC address in step 616. The remaining active network nodes adopt the local MAC address of the newly elected master network node as the virtual chassis MAC address for the virtual chassis system 100 in step 618.

Figure 19:
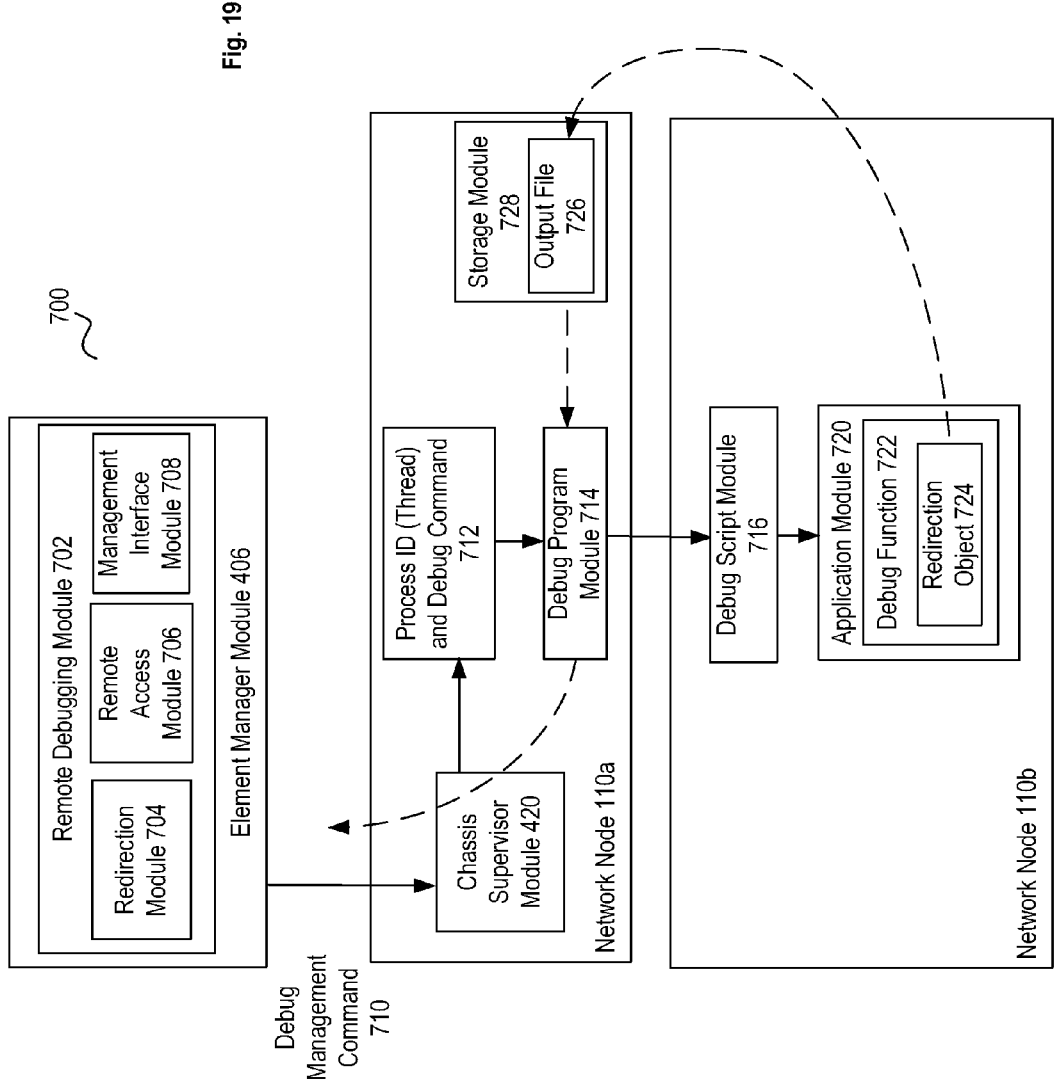
FIG. 19 illustrates a schematic block diagram of an embodiment for a remote debugging system in accordance with the present invention.

FIG. 19 illustrates a schematic block diagram of an embodiment for a remote debugging system 700. The remote debugging system 700 is operable to access application modules 720 on remote network nodes 110b from a local network node 110a in a virtual chassis system 100. Though described with respect to a multi-slot chassis based node architecture in a virtual chassis system 100, the remote debugging system 700 is operable in other types of network configurations and node architectures.

The remote debugging module 702 includes a redirection module 704, remote access module 706 and management interface module 708. The remote debugging module 702 may be implemented on element manager module 406 or on any other processing module or computing device operably coupled locally or remotely to network node 110a in the virtual chassis system 100. The remote debugging module 702 is operable to communicate with the network node 110a using various types of communication protocols, such as telnet session, ssh session, etc. In an embodiment the remote debugging module 702 communicates a debug management command 710 to a control manager module (CMM) 150 in a local network node 110a.

In an embodiment, debug management command 710 is received by chassis supervisor module 420 of the CMM 150 of network node 110a, though other management modules or applications may process the debug management command 710 in addition to or alternatively from the chassis supervisor module 420 of the CMM 150. The chassis supervisor module 420 processes the debug management command 710 and generates a process identification (ID) and debug command 712 for execution by the remote network node 110b. The process ID or thread identifies a process of an application module 720 for debugging by the debug command. Debug program module 714 receives the process ID and debug command and initiates debug script module 716 in the remote network node 110b. The debug script module 716 is a script that preferably initiates batch execution of a number of commands in the identified process in application module 720. This batch execution is called debug function 722. The redirect object 724 redirects the output of the debug function 722 to a preselected destination. The remote access module 706 is operable to execute a command to retrieve the output from the preselected destination for storage on the local network node 110a in storage module 728 in output file 726. The output file 726 may then be accessed and reviewed by the remote debugging module 702.

FIG. 20 illustrates a logic flow diagram of an embodiment of a method for redirection of an output of a remote debug module 702. The redirection module 704 is operable to redirect an output of a process after execution of the debug function 722. The output is redirected to a selected location or device, such as a file in a file directory of a virtual terminal (e.g. telnet, ssh), locally connected terminal or remote terminal. In step 752, a destination of the output of the process is selected and a redirection object 724 is saved with the selected destination. In step 754, the standard output file descriptor, such as a file and file directory, of the process is stored. In step 756, after execution of the debug function 722, the redirection object 724 redirects the output of the process to the selected destination. In step 758, the redirection object 724 is deleted and the standard output file descriptor is restored.

FIG. 21 illustrates a logic flow diagram of an embodiment of a method 760 for remote access of a network node 110 in the virtual chassis system 100. The remote access module 706 is operable to provide access for management functions to a remote network node. For example, the remote access module 706 is operable to access a network interface module 152, a CMM 150, application module, etc. located on a remote network node through a local network node in the virtual chassis system 100. Though in an embodiment described herein, debug functions are used as an example, other management functions, such as management commands for operation or configuration, status checks, etc. may also utilize the remote access module 706. In step 762, the remote access module 706 establishes a remote session with the target network node or module thereof. The remote access module 706 may include in an embodiment an ssh client application for logging into the remote network node and executing commands though other applications and protocols, such as rlogin, and rsh, mobile shell (MOSH) or other remote access applications may also be implemented. The remote access module 706 opens the remote session with the target network node or module thereof and allows for the execution of the debug function 722 in step 764. The output of the debug function is stored in the selected directory in step 766 as described with respect to FIG. 20. The remote access module 706 executes a command to retrieve the stored file from the selected destination in step 768.

FIG. 22 illustrates a logic flow diagram of an embodiment of a method 770 for a management interface module 708. The management interface module 708 is operable to provide a graphical user interface for entering and accessing debug management commands 710. The management interface module 708 provides assistance on parameters and command names needed for entering the debug management commands 710. In step 772, the management interface module 708 provides a set of debug management commands in a graphical user interface (GUI) and in step 774, receives the management commands through the GUI, such as a command line interface or other type of GUI. In step 776, the management command is processed by the chassis supervisor module 420 of the CMM 150 of network node 110a, though other management modules or applications may process the debug management command 710 in addition to or alternatively from the chassis supervisor module 420 of the CMM 150. In step 778, the chassis supervisor module 420 informs management of command execution to prevent interference with other tasks and prevent acceptance of other management commands before completion of current command execution.

The remote debugging module 702 enhances debugging of application modules in remote network nodes by providing access to the remote network nodes without the need of direct console access. It helps to automate complex operations and deliver a user friendly interface and minimize impact on current running application modules.

The network nodes 1110 in a virtual chassis system 100 are treated as a single logical device with a common virtual chassis MAC address. As such, external nodes 112 are operable to actively forward traffic on all the links of a VC-LAG 114 operatively coupled to two or more network nodes 110. This feature enables multiple homing of the external nodes 112 to the network nodes 110 without requiring spanning tree protocols between the external nodes and network nodes while still facilitating a carrier-grade detection and convergence time to edge uplink failures as well as network node 110 failures. Another advantage of the active forwarding mode of all the VC-LAG 114 uplinks to the virtual chassis system 100 is increased efficiency of the use of bandwidth of the VC-LAG 114 links. The virtual chassis system 100 thus provides a resilient network between network nodes having one or more different types of node architectures in one or more different types of network topologies.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item, or one item configured for use with or by another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional schematic blocks, and other illustrative blocks, modules and components herein, can be implemented as illustrated or combined or separated into discrete components, application specific integrated circuits, processors executing appropriate software and the like or any combination thereof.

The present invention is described herein, at least in part, in terms of one or more embodiments. An embodiment is described herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements.

The term "module" is used in the description of the various embodiments of the present invention. A module includes a processing module (as described above), a functional block, hardware, and/or software stored on memory operable to perform one or more functions as described herein. Note that, if the module is implemented via hardware, the hardware may operate independently and/or in conjunction with software and/or firmware. When a module is implemented as software stored in memory, the module is operable to use a processing module or other hardware to execute the software stored in memory in the module to perform the functions as described herein. A module described herein may include one or more sub-modules, each of which may be one or more modules, be incorporated into one or more other modules or include one or more other modules.

While particular combinations of various functions and features of the present invention are expressly described herein, other combinations of these features and functions are likewise possible. The embodiment described herein are not limited by the particular examples described and may include other combinations and embodiments.

What is claimed is:

1. A network node in a virtual chassis system, comprising:
   a plurality of virtual fabric links (VFLs) operably coupled between the network node and a plurality of other network nodes in the virtual chassis system;
   a control management module operable to generate a topology database that includes a chassis identification and local address of a master network node in the virtual chassis system and chassis identifications and local addresses of the plurality of other network nodes in the virtual chassis system, the control management module operable to:
      adopt the local address of the master network node in the virtual chassis system as a virtual chassis address of the network node for addressing of the virtual chassis system by external nodes; and
   at least a first network interface module operable to:
      store one or more address tables that include destination addresses associated with hardware device information of the plurality of other network nodes in the virtual chassis system;
      receive an incoming packet on an external port interface, wherein the incoming packet includes a first destination address;
      determine from the one or more address tables destination hardware device information of one of the plurality of other network nodes in the virtual chassis system associated with the first destination address, that includes access a first forwarding table having a list of destination address entries and associated hardware device information of the one of the plurality of other network nodes in the virtual chassis system associated with the first destination address, wherein the associated hardware device information of the one of the plurality of other network nodes includes a chassis identification of the one of the plurality of other network nodes;
      access a second address table that includes a list of chassis identifications and associated VFL identifiers, wherein the associated VFL identifiers identify at least one VFL for forwarding a packet to one of the plurality of other network nodes identified by the chassis identification;
      generate a packet with pre-pended header from the incoming packet, wherein the pre-pended header includes the destination hardware device information of the one of the plurality of other network nodes in the virtual chassis system; and
      transmit the packet with pre-pended header over one of the plurality of virtual fabric links to the one of the plurality of other network nodes in the virtual chassis system.

2. The network node of claim 1, wherein the at least a first network interface module is operable to:
   determine from the second access table a VFL identifier associated with the chassis identification of the one of the plurality of other network nodes in the virtual chassis system associated with the first destination address; and
   transmit the packet with pre-pended header over the one of the plurality of virtual fabric links associated with the VFL identifier to the one of the plurality of other network nodes in the virtual chassis system associated with the first destination address.

3. The network node of claim 2, wherein the first network interface module comprises:
   a switching circuit that includes a plurality of external port interfaces, wherein the first network interface module receives the incoming packet on one of the plurality of external port interfaces; and
   a queuing circuit that includes a queue management module.

4. The network node of claim 3, wherein the switching circuit further includes:
   a pre-pended packet header interface (PPHI) operable to generate the packet with pre-pended header, wherein the pre-pended header includes the destination hardware device information.

5. A network node in virtual chassis system, comprising:
   a plurality of virtual fabric links (VFLs) operably coupled between the network node and a plurality of other network nodes in the virtual chassis system;
   a control management module operable to generate a topology database, wherein the topology database includes a chassis identification and local address of a master network node in the virtual chassis system and chassis identifications and local addresses of the plurality of other network nodes in the virtual chassis system, the control management module operable to:
      adopt the local address of the master network node in the virtual chassis system as a virtual chassis address of the network node for addressing of the virtual chassis system by external nodes when the network node is operating in a virtual chassis mode; and at least a first network interface module operable to:
receive a packet with a destination address from an external node;
access one or more forwarding tables to determine hardware device information of one of the plurality of other network nodes associated with the destination address, wherein the hardware device information includes a VFL identifier of at least one VFL coupled to the network node and the one of the plurality of other network nodes associated with the destination address; and
transmitting the packet over the at least one VFL coupled to the network node and the one of the plurality of other network nodes associated with the first destination address.

6. The network node of claim 5, wherein the control management module is further operable to:
initiate a first configuration module when the network node is operating in a virtual chassis mode; and
initiate a second configuration module when the network node is operating in a standalone mode.

7. The network node of claim 6, wherein the control management module is further operable to:
transition from a standalone mode to a virtual chassis mode by reconfiguring parameters of the hardware device information and initiating the first configuration module.

8. The network node of claim 5, wherein the control management module is further operable to:
receive a remote debug management command to redirect an output of a process in response to a debug function in the network node;
store a standard output descriptor of the process;
redirect the output of the process in response to the debug function to a selected destination; and
restore the standard output descriptor of the process.

9. A method for a network node in a virtual chassis system, wherein a plurality of virtual fabric links (VFLs) are operably coupled between the network node and a plurality of other network nodes in the virtual chassis system comprising:
generating a topology database that includes a chassis identification and local address of a master network node in the virtual chassis system and chassis identifications and local addresses of the plurality of the other network nodes in the virtual chassis system;
adopting the local address of the master network node as a virtual chassis address of the network node for addressing of the virtual chassis system be external nodes when the network node is operating in a virtual chassis mode;
storing one or more address tables that include destination addresses associated with hardware device information of a plurality of other network nodes in the virtual chassis system;
receiving an incoming packet on an external port interface, wherein the packet includes a first destination address;
determining from the one or more address tables destination hardware device information of one of the plurality of other network nodes in the virtual chassis system associated with the first destination address;
generating a packet with pre-pended header from the incoming packet, wherein the pre-pended header includes the destination hardware device information of the one of the plurality of other network nodes in the virtual chassis system; and
transmit the packet with pre-pended header over one of the plurality of virtual fabric links to the one of the plurality of other network nodes in the virtual chassis system.

10. The method of claim 9, wherein determining from the one or more address tables destination hardware device information includes:
accessing a first forwarding table, wherein the first forwarding table includes a list of destination address entries and associated hardware device information of one of the plurality of other network nodes in the virtual chassis system associated with the first destination address.

11. The method of claim 10, wherein the destination hardware device information of the one of the plurality of other network nodes in the virtual chassis system associated with the first destination address includes a chassis identification of the one of the plurality of other network nodes.

12. The method of claim 11, further comprising:
accessing a second address table, wherein the second address table includes a list of chassis identifications and associated VFL identifiers, wherein the associated VFL identifiers identify at least one VFL for forwarding a packet to one of the plurality of other network nodes identified by the chassis identification.

13. The method of claim 12, further comprising:
determining from the second access table a VFL identifier associated with the chassis identification of the one of the plurality of other network nodes in the virtual chassis system associated with the first destination address; and
transmitting the packet with pre-pended header over the one of the plurality of virtual fabric links associated with the VFL identifier to the one of the plurality of other network nodes in the virtual chassis system associated with the first destination address.

* * * * *